United States Patent [19]
Ohkawa et al.

[11] Patent Number: 5,652,037
[45] Date of Patent: Jul. 29, 1997

[54] INFORMATION RECORDING MEDIUM

[75] Inventors: Hideki Ohkawa; Motonari Matsubara, both of Yokohama; Nobuhisa Yoshida, Zushi, all of Japan

[73] Assignee: Kabushiki Kaisha Toshiba, Japan

[21] Appl. No.: 701,276

[22] Filed: Aug. 22, 1996

Related U.S. Application Data

[62] Division of Ser. No. 291,480, Aug. 17, 1994, Pat. No. 5,580,632.

[30] Foreign Application Priority Data

Sep. 22, 1993 [JP] Japan ..................... 5-236961
Mar. 24, 1994 [JP] Japan ..................... 6-076326

[51] Int. Cl.$^6$ ................................ B32B 3/00
[52] U.S. Cl. .............. 428/64.1; 428/64.2; 428/64.4; 428/64.6; 428/913; 430/270.12; 430/270.13; 430/495.1; 430/945; 369/275.2; 369/283; 369/288
[58] Field of Search ................... 428/64.1, 64.2, 428/64.4, 64.6, 913; 430/270.1, 270.11, 270.12, 270.13, 495.1, 945; 369/275.2, 283, 288

[56] References Cited

U.S. PATENT DOCUMENTS

| | | |
|---|---|---|
| 4,670,345 | 6/1987 | Morimoto et al. . |
| 5,024,910 | 6/1991 | Ohta . |
| 5,154,957 | 10/1992 | Yamada . |
| 5,254,382 | 10/1993 | Ueno . |
| 5,289,453 | 2/1994 | Ohno et al. . |
| 5,348,783 | 9/1994 | Ohno et al. . |

FOREIGN PATENT DOCUMENTS

| | | |
|---|---|---|
| 0 150 829 | 8/1985 | European Pat. Off. . |
| 0 499 273 A3 | 8/1992 | European Pat. Off. . |
| G 11B 7/24 | 8/1990 | Germany . |
| 62-53886 | 3/1987 | Japan . |
| 6 119 657 | 4/1994 | Japan . |

OTHER PUBLICATIONS

J. Appl. Phys., N. Yamada, E. Ohno, K. Nishiuchi, N. Akohira and M. Takoa, 69(5), 2849 (1991), "Rapid–phase transitions of Ge Te–Sb$_2$ Te$_3$ pseudobinary amorphous thin films for an optical disk memory".

G.B. Fischer, J. Tauc, and Y. Verhelle, Proceedings of the Fifth International Conference on Amorphous and Liquid Semiconductors, "Vibrational modes and bonding in the amorphous Ge$_x$ Te$_{1-9}$" (Taylor and Francis Ltd., London, 1977) p. 1259.

"Extended Abstracts (The 54th Autumn Meeting, 1993); The Japan Society Applied Physics".

(List continued on next page.)

*Primary Examiner*—Patrick Ryan
*Assistant Examiner*—Elizabeth Evans
*Attorney, Agent, or Firm*—Banner & Witcoff, Ltd.

[57] ABSTRACT

The present invention provides an information recording medium including a first recording film formed on a substrate and having an amorphous phase made of an alloy containing at least Ge and Te, and a second recording film formed on the first recording film and made of a material with a relatively large light absorption coefficient, wherein the alloy of the first recording film exhibits a Raman scattering spectrum having scattering peaks at 140 to 160 cm$^{-1}$ and 120 to 130 cm$^{-1}$ and no scattering peaks at 100 to 110 cm$^{-1}$, and recording is performed by changing optical characteristics by alloying the materials of the first and second recording films by radiating recording light on the first and second recording films. The present invention provides an information recording medium including a recording film formed on a substrate and having an amorphous phase made of an alloy containing Ge, Sb, and Te, wherein the amorphous phase of the recording film is a mixed phase containing cluster molecules containing of two elements, Ge—Te and/or Sb—Te, and recording is performed by changing optical characteristics by changing in phase the cluster molecules into corresponding crystalline GeTe and crystalline SbTe by radiating recording light on the recording film.

5 Claims, 12 Drawing Sheets

OTHER PUBLICATIONS

"Extended Abstracts (The 37th Spring Meeting, 1990); The Japan Society of Applied Physics and Related Societies".

"Structural Changes of Amorphous $GeTe_2$ Films by Annealing (Formation of Metastable Crystalline $GeTe_2$ Films), "Fukumoto, et al., *Journal of the Physical Society of Japan*, vol. 56, pp. 158–162, Jan. 1987.

"A Raman and Far–Infrared Investigation of Phonons in the Rhombohedral $V_2$–$VI_3$ Compounds," Richter, et al., *physica status solidi (b) basic research*, vol. 84, No. 2, pp. 407–824, Dec. 1, 1977.

"The Raman Spectrum of Amorphous Tellurium," Brodsky, et al., *physica status solidi (b) basic research*, vol. 52, No. 2, pp. 347–714, Aug 1, 1972.

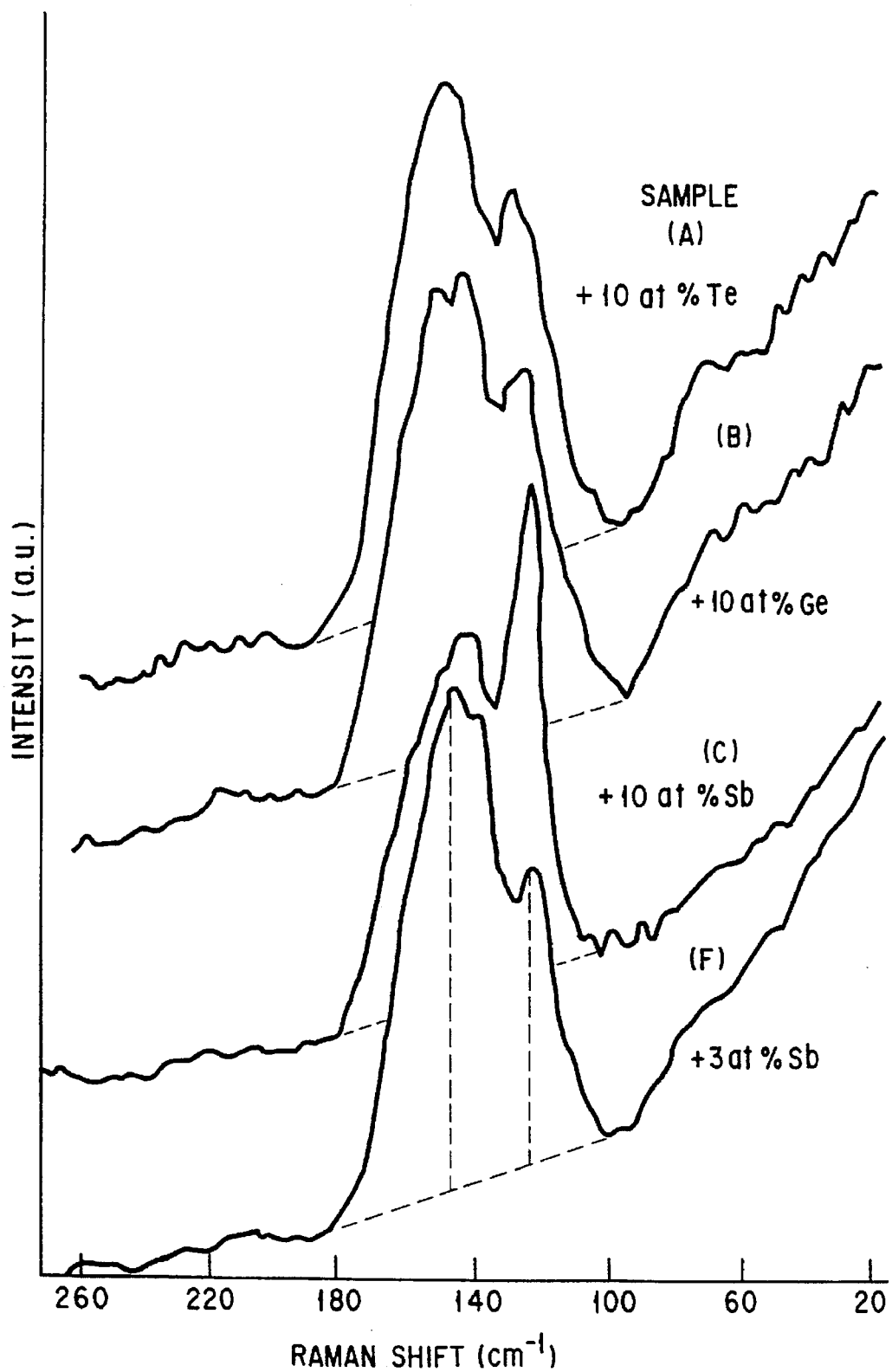
F I G. 3

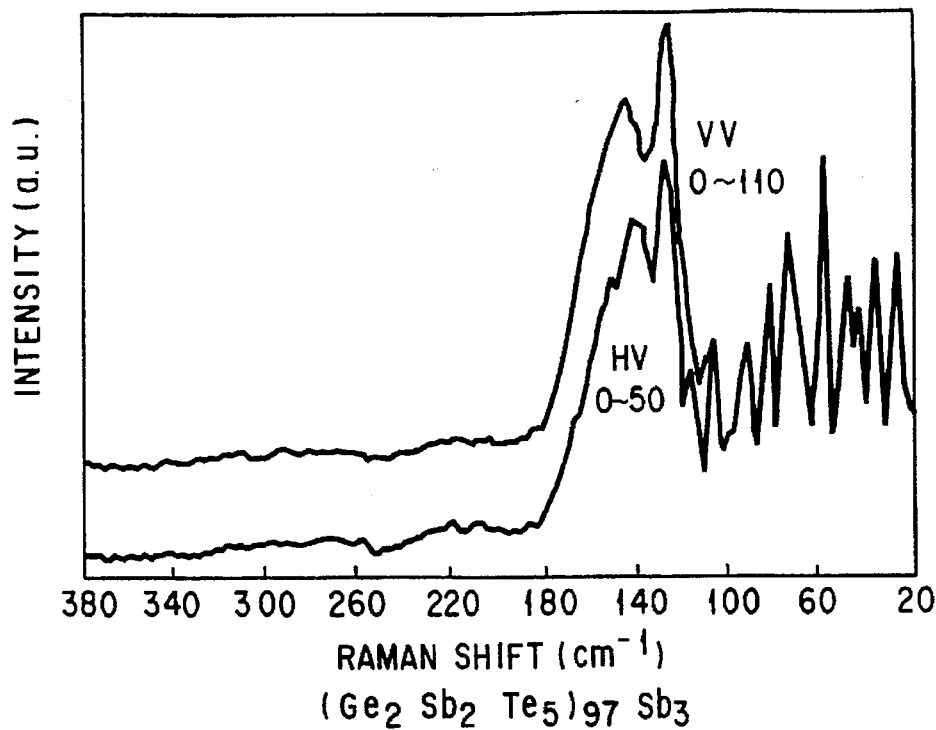
F I G. 13
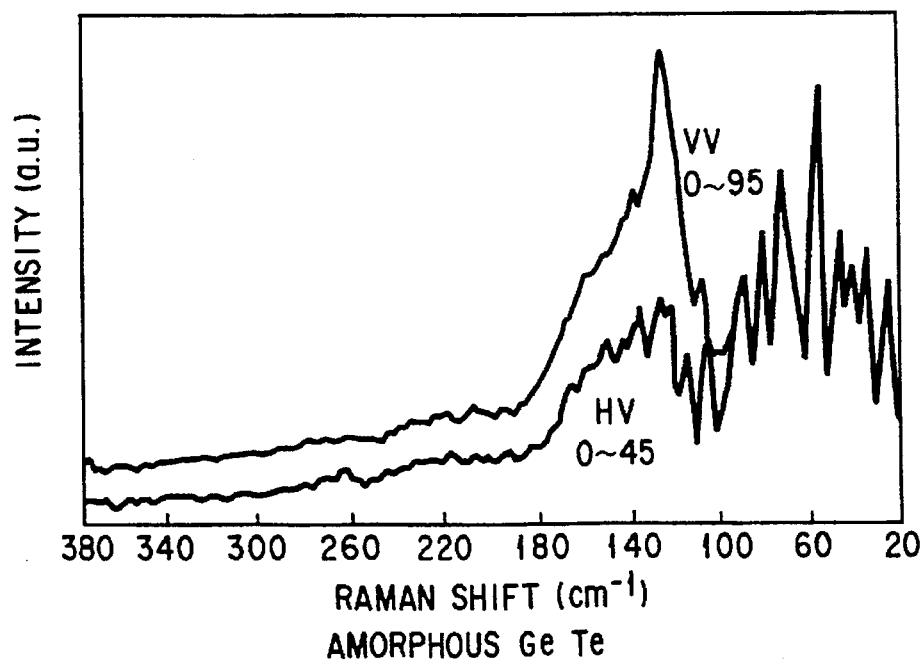
F I G. 14

INFORMATION RECORDING MEDIUM

This application is a division of application Ser. No. 08/291,480, filed Aug. 17, 1994, now U.S. Pat. No. 5,580,632.

BACKGROUND OF THE INVENTION

1. Field of the Invention

The present invention relates to an information recording medium.

2. Description of the Related Art

The first subject of the present invention is as follows.

Some conventional information recording media are manufactured by forming a film made of, e.g., a GeSbTe alloy on a substrate made of a transparent material, such as an acrylic resin or a polycarbonate resin, and forming a film made of a metal, such as Bi or a BiTe alloy, having a large light absorption coefficient on the GeSbTe alloy film. In performing recording in an information recording medium of this type, laser light is radiated to heat the two films to diffuse the atoms of the materials forming these films, thereby alloying the films. Reproduction is performed by making use of the difference in reflectance between the alloyed recorded region and an unrecorded region.

Generally, a GeSbTe film left intact in a state immediately after formation has an amorphous phase. When this amorphous phase is checked by an X-ray diffraction method (XRD) which is normally used in checking lattice structures, only a broad diffraction peak indicating an amorphous phase is given, but no information about amorphous phases inherent in individual materials can be obtained. Therefore, no information about the state of the amorphous phase of the GeSbTe film can be obtained either. For this reason, the relationship between the GeSbTe film and the recording sensitivity is totally unknown. To check which composition maximizes the recording sensitivity when the GeSbTe film is used as a recording film, it is necessary to form GeSbTe films having different compositions and check the respective resulting recording sensitivities.

Generally, an amorphous phase transforms into a crystalline phase when heated. Therefore, it is possible to estimate the recording sensitivity of an amorphous phase by using the crystallization temperature or the crystallization energy as a parameter without using any detailed knowledge about the amorphous phase. However, since the recording sensitivity estimated by using the crystallization temperature or the crystallization energy as a parameter does not necessarily agree with an actual recording sensitivity, it is not possible to determine a condition in which a high recording sensitivity is obtained. Therefore, it is currently impossible to specify an information recording medium with the highest recording sensitivity.

The second subject of the present invention is as follows.

As discussed above, optical recording is conventionally done by using the difference in reflectance produced between a recorded region and an unrecorded region of a recording film by the change from an amorphous phase to a crystalline phase. As the composition of a recording film, a composition near a stoichiometric composition represented by $Ge_2Sb_2Te_5$, in the case of a GeSbTe alloy, is used even for a recording film used in an overwrite scheme or a recording film which causes diffusion and alloying. Commonly, $(Ge_2Sb_2Te_5)_{90}Ge_{10}$ containing Ge in excess by about 10% is used as the composition of this intermetallic compound. A representation of this type is used in order to readily understand how the physical meaning changes from an intermetallic compound composed of $Ge_2Sb_2Te_5$. Note that an intermetallic compound represented by $Ge_2Sb_2Te_5$ is regarded as a mixed crystal of binary compounds, GeTe and $Sb_2Te_3$, i.e., as $(GeTe)_2(Sb_2Te_3)$.

An amorphous structure is generally characterized in that no X-ray diffraction peak is produced from any specific crystal face even when the structure is checked by X-ray diffraction, since there is no translational symmetry in a structure in a corresponding crystalline state. Therefore, X-ray diffraction has been conventionally used to check whether a substance of interest has a crystalline phase or an amorphous phase. However, if a substance to be checked contains chalcogenide elements, such as S, Se, or Te, for example, if a substance to be checked is a GeSbTe film with an amorphous phase, it is only possible to merely infer that elements Ge, Sb, and Te exist in a randomly distributed state. That is, it was only possible to confirm the existence of one structure termed amorphous GeSbTe by performing X-ray photoelectron spectroscopy (Oshima et al., Extended Abstracts (The 37th Spring Meeting, 1990); The Japan Society of Applied Physics and Related Societies, Presentation No. 31p-ZE-1, p. 406). Therefore, this result does not refer much to the presence of a chemical order, although it depends on the compositions, but conclude that elements Ge, Sb, and Te exist at random.

As described above, an information recording medium uses the phase change from an amorphous phase to a crystalline phase or vice versa in recording information. Therefore, since the correspondence of an amorphous structure with a crystal structure is totally unknown, it is impossible to clearly determine in which region high-sensitivity recording can be performed in a composition containing of Ge, Sb, and Te, regardless of whether the recording is of a write once type or an overwrite type; that is, the determination is done by trial and error. This is so because the structure of an alloy containing of Ge, Sb, and Te in an amorphous state is completely unknown.

Using an amorphous-phase GeSbTe alloy film as a recording film has already been reported by, e.g., Jpn. Pat. Appln. KOKAI Publication No. 62-53886 and U.S. Pat. No. 4,670,345. In these patent specifications, the composition of a GeSbTe alloy as the material of a recording film is expressed as $(Sb_xTe_{1-x})_yGe_{1-y}$, wherein $\underline{x}$ is 0.05 to 0.7 and $\underline{y}$ is 0.4 to 0.8. The purpose of these disclosures is to improve the thermal stability of $Sb_2Te_3$ by adding Ge to $Sb_2Te_3$ as a base, thereby raising the crystallization temperature.

These specifications do not at all mention an amorphous state, particularly a chemical bonded state or a cluster molecular state between elements Ge, Sb, and Te. That is, Jpn. Pat. Appln. KOKAI Publication No. 62-53886 or U.S. Pat. No. 4,670,345 does not at all touch upon the relationship between the chemical bonding state and the optical recording sensitivity in an amorphous state. In addition, these patent specifications have disclosed that an information recording medium can also be formed by stacking a GeSbTe film and a second recording film. However, the specifications do not at all refer to the influence that the internal chemical bonding state of the GeSbTe film has on the phase change of the layered film.

Furthermore, these patent specifications do not at all touch upon the effect that Ge—Te and Sb—Te cluster molecules consisting of two elements in the amorphous-phase GeSbTe film have on the recording sensitivity, or the effect that the existing bonds or cluster molecules have on the recording sensitivity. Basically, the expression ($Sb_xTe_{1-}$ $x)_y\text{Ge}_{1-y}$ gives the impression that a chemical bond is present between Sb and Te. Although this is true in at least a crystalline state, it has not been confirmed yet whether this is also true for an amorphous state.

SUMMARY OF THE INVENTION

The present invention has been made in consideration of the above situations and has as its object to provide an information recording medium with a high recording sensitivity.

The above object of the present invention is achieved by an information recording medium comprising a first recording film formed on a substrate and having an amorphous phase made of an alloy containing at least Ge and Te, and a second recording film formed on the first recording film and made of a material with a relatively large light absorption coefficient, wherein the alloy of the first recording film exhibits a Raman scattering spectrum having scattering peaks at 140 to 160 cm$^{-1}$ and 120 to 130 cm$^{-1}$ and no scattering peaks at 100 to 110 cm$^{-1}$, and recording is performed by changing optical characteristics by alloying the materials of the first and second recording films by radiating recording light on the first and second recording films.

The above object of the present invention is also achieved by an information recording medium comprising a recording film formed on a substrate and having an amorphous phase made of an alloy containing Ge, Sb, and Te, wherein the amorphous phase of the recording film is a mixed phase containing cluster molecules consisting of two elements, Ge—Te and/or Sb—Te, and recording is performed by changing optical characteristics by changing in phase the cluster molecules into corresponding crystalline GeTe and crystalline SbTe by radiating recording light on the recording film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3 and 4 are graphs showing the Raman spectra of GeSbTe films having several different compositions;

FIG. 13 is a graph showing the polarized Raman spectra of amorphous (Ge$_2$Sb$_2$Te$_5$)$_{97}$Sb$_3$;

FIG. 14 is a graph showing the polarized Raman spectra of amorphous GeTe;

DETAILED DESCRIPTION OF THE PREFERRED EMBODIMENTS

Figure 1:
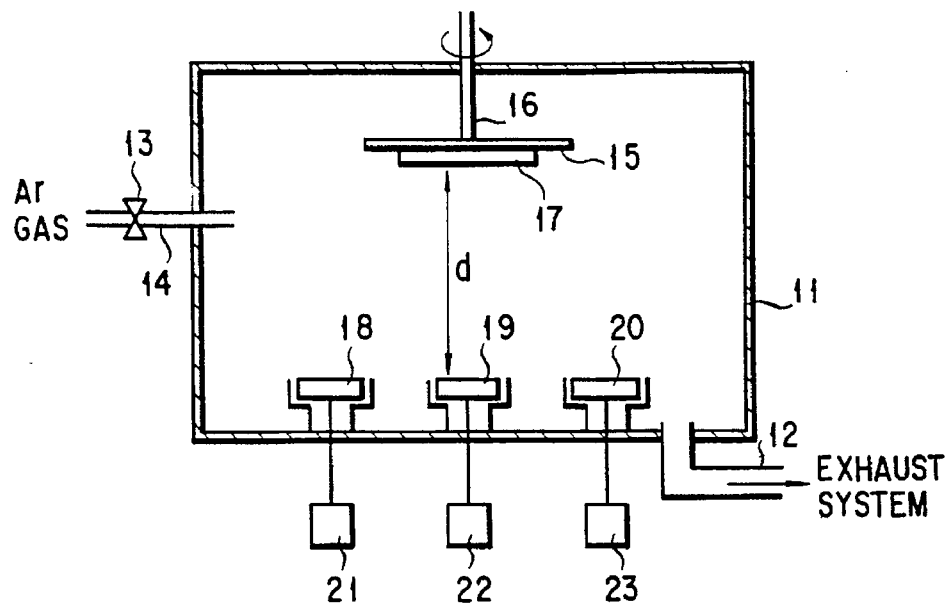
FIGS. 1 and 7 are schematic views each showing a sputtering apparatus for use in formation of a recording film.

An information recording medium according to the first invention of the present invention is characterized by comprising a first recording film formed on a substrate and having an amorphous phase made of an alloy containing at least Ge and Te, and a second recording film formed on the first recording film and made of a material with a relatively large light absorption coefficient, wherein the alloy of the first recording film exhibits a Raman scattering spectrum having scattering peaks at 140 to 160 cm$^{-1}$ and 120 to 130 cm$^{-1}$ and no scattering peaks at 100 to 110 cm$^{-1}$.

This information recording medium has a high recording sensitivity since it has the recording film made of the alloy containing at least Ge and Te having a composition by which a Raman scattering spectrum with no scattering peaks at 100 to 110 cm$^{-1}$ is given.

An information recording medium according to the second invention of the present invention is characterized by comprising a recording film formed on a substrate and having an amorphous phase made of an alloy containing Get Sb, and Te, wherein the amorphous phase of the recording film is a mixed phase containing cluster molecules consisting of two elements, Ge—Te and/or Sb—Te, and recording is performed by changing optical characteristics by changing in phase the cluster molecules into corresponding crystalline GeTe phase and crystalline SbTe phase by radiating recording light on the recording film.

This information recording medium has also a high recording sensitivity since the amorphous phase contains the cluster molecules consisting of two elements, Ge—Te and/or Sb—Te, and these cluster molecules alone are crystallized to perform recording.

In the present invention, a transparent material such as a polycarbonate resin, an acrylic resin, or glass can be used as the substrate material. Examples of the alloy containing at least Ge and Te are a GeSbTe alloy, a GeSnTe alloy, and a GeInTe alloy. As the material with a relatively large light absorption coefficient, it is possible to use Bi, a BiTe alloy, Pb, Pd, Sn, or In.

In the arrangement of the information recording medium of the present invention, a protective film, e.g., a metal oxide film, a metal nitride film, a metal sulfide film, or a layered film of a metal sulfide film and a metal oxide film, such as a $ZnS/SiO_2$ film, is preferably interposed between the substrate and the first recording film. This is so because, if a recording film, e.g., a GeSbTe film is formed directly on a substrate, moisture or oxygen in the air oxidizes the recording film through the substrate. A protective film can also be formed on the second recording film to prevent oxidation.

The thickness of this protective film must be defined as follows. That is, when the protective film is a $ZnS/SiO_2$ film, the thickness of the film is preferably 10 nm or more from a practical viewpoint because the refractive index of the film is about 2 near a wavelength of 830 nm, i.e., larger than that of the resin substrate made of a polycarbonate resin or an acrylic resin. Since, however, the reflectance tends to decrease as the film thickness increases, because the condition of multiple interval reflection is fulfilled about the staked layer structure. It is necessary to set the film thickness within a range in which no unstable tracking operation of driving is caused.

In the first invention of the present invention, the ratio of the Raman scattering intensity of the scattering peak at 120 to 130 $cm^{-1}$ to the Raman scattering intensity of the scattering peak at 140 to 160 $cm^{-1}$ must be at least 1. This is so because the recording sensitivity decreases if the scattering peak intensity ratio is less than 1.

The embodiments of the present invention will be described in detail below with reference to the accompanying drawings.

(First Embodiment)

FIG. 1 is a schematic view showing a sputtering apparatus to be used in forming a recording film on a substrate. In FIG. 1, reference numeral 11 denotes a chamber. An exhaust pipe 12, which is connected to an rotary oil pump and a cryopump (neither is shown), is connected to the lower portion of the chamber 11. One end of a gas supply pipe 14 having a flow rate adjusting valve 13 connected to a flow rate adjusting means (not shown) is connected to the side wall of the chamber 11. The other end of the pipe 14 is connected to an Ar gas source (not shown). A support rod 16 having a substrate support plate 15 at the lower end is inserted through the top of the chamber 11 so that the substrate support plate 15 is located inside the chamber 11. A substrate 17 is chucked on this substrate support plate 15 by, e.g., a mechanical clamp. On the bottom of the chamber 11, a $ZnS/SiO_2$ target 18, a GeSbTe alloy target 19, and a BiTe alloy target 20 are arranged. The targets 18, 19, and 20 are connected to radio-frequency (RF) power applying means 21, 22, and 23, respectively.

Films were formed on an acrylic resin substrate by using the sputtering apparatus with the above arrangement. First, the chamber 11 was evacuated to set the internal pressure at $1.2 \times 10^{-3}$ Pa or less than that by using the exhaust system. Subsequently, the flow rate adjusting valve 13 was opened to introduce Ar gas from the gas supply pipe 14 into the chamber 11 while the flow rate was adjusted by the flow rate adjusting means. At this time, the internal Ar gas pressure of the chamber 11 was held constant by controlling the exhaust rate of the exhaust system and the Ar gas flow rate.

Figure 2:
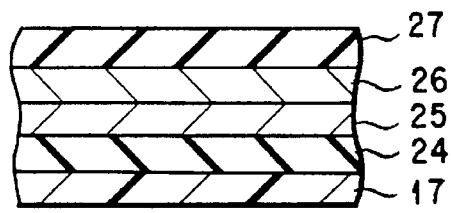
FIG. 2 is a sectional view showing one embodiment of an information recording medium according to the present invention.

While the support rod 16 was rotated, sputtering was performed by applying an RF power of 70 W from the RF power applying means 21 to the $ZnS/SiO_2$ target 18. During this sputter discharge, the internal pressure of the chamber 11 was set at 0.6 Pa, and a distance $\underline{d}$ between the acrylic resin substrate and the target was set to 110 mm. In this manner, a 40-nm thick $ZnS/SiO_2$ film 24 was formed on the substrate 17, as illustrated in FIG. 2.

Then, the internal pressure of the chamber 11 was set at $1.2 \times 10^{-3}$ Pa or less than that, and Ar gas was again introduced from the gas supply pipe 14 into the chamber 11 while the flow rate was adjusted by the flow rate adjusting means. Thereafter, sputtering was performed by applying an RF power of 60 W from the RF power applying means 22 to the GeSbTe alloy target 19, forming a 50-nm thick GeSbTe film 25 on the $ZnS/SiO_2$ film 24. In this case, switching between the targets was performed by using, e.g., a shutter. Note that the internal pressure of the chamber 11 was set at 0.6 Pa during the sputter discharge.

Subsequently, the internal pressure of the chamber 11 was again set at $1.2 \times 10^{-3}$ Pa or less than that, and Ar gas was introduced from the gas supply pipe 14 into the chamber 11 while the flow rate was adjusted by the flow rate adjusting means. Thereafter, sputtering was performed by applying an RF power of 60 W from the RF power applying means 23 to the BiTe alloy target 20, forming a 30-nm thick BiTe film 26 on the GeSbTe film 25. In this case, switching between the targets was performed by using, e.g., a shutter. Note that the internal pressure of the chamber 11 was set at 0.67 Pa during the sputter discharge.

Finally, the internal pressure of the chamber 11 was again set at $1.2 \times 10^{-3}$ Pa or less than that, and Ar gas was introduced from the gas supply pipe 14 into the chamber 11 while the flow rate was adjusted by the flow rate adjusting means. Thereafter, sputtering was performed by applying an RF power of 70 W from the RF power applying means 21 to the $ZnS/SiO_2$ alloy target 18, forming a 40-nm thick $znS/SiO_2$ film 27 on the BiTe film 26. In this case, switching between the targets was performed by using, e.g., a shutter. Note that the internal pressure of the chamber 11 was set at 0.6 Pa during the sputter discharge.

FIG. 3 shows the Raman spectra of the first recording films when the individual constituent elements of $Ge_{22}Sb_{22}T_{56}$ were added in excess by 10 at %. Samples (A), (B), (C), and (F) for these Raman spectra were formed to have a thickness of a few hundred nanometers by sputtering only GeSbTe on Si substrates by using Ar gas in the sputtering apparatus illustrated in FIG. 1.

As shown in FIG. 3, the spectrum of the sample (A) in which Te was added in excess by 10 wt % agrees well with the spectrum of the sample (B) in which Ge was added in excess by 10 wt %. In contrast to these spectra, the peak intensity on the small-wave-number side is higher than that on the large-wave-number side in the spectrum of the sample (C) in which Sb was added in excess by 10 wt %.

Analysis of the Raman spectra in FIG. 3 will be described below. The principle of Raman scattering spectroscopy will be explained first. When laser light is radiated on a solid, the electronic polarizability of the atoms or the molecules constituting the solid changes. If the electronic polarizability is changed by lattice vibrations or intramolecular vibrations in the solid, the electronic polarization present in the solid is induced by new vibrations associated with this change in the electronic polarizability as well as by components oscillating at the same frequency as that of the laser light. Consequently, scattered light contains both light having the same frequency as the frequency of the oscillation of the laser light, and light having a frequency different from that frequency. The former light is Rayleigh scattered light commonly known as scattered light, and the latter light is Raman scattered light. The difference in frequency between this Raman scattered light and the laser light gives the frequency of atomic vibrations or molecular vibrations in the solid. The abscissa of a Raman spectrum represents this frequency as a Raman shift in wave numbers ($cm^{-1}$).

For example, the Raman spectra of amorphous GeTe films are reported in, e.g., (a) G. B. Fisher and J. Tauc, Proceedings of the Fifth International Conference on Amorphous and Liquid Semiconductors. p. 1,259 (1973), Garmisch-Partenkirchen; (b) K. Tsunemoto, T. Sugishima, T. Imura, and Y. Osaka, J. Non-Cryst. Solids, 95/96, 509 (1987); and (c) M. G. Fee and H. J. Trodahl, "Disordered Semiconductors," M. A. Kastner, G. A. Thomas, and S. R. Ovshinsky ed., Plenum Press, 1987, p. 307. The Raman spectra of crystalline GeTe films are reported in, e.g., E. F. Steigmeier and G. H. Harbeke, Solid State Commun., 8, 1275 (1970). Generally, in an amorphous state, a spectrum reflecting the state density of vibrations is measured, no symmetrical center of the structure is present, and optical activity is possible for both IR and Raman. However, no Raman spectrum of an amorphous GeSbTe film has been reported yet. In addition, individual peaks have not been completely identified yet from analysis of Raman spectra.

In a crystalline state, a $Ge_2Sb_2Te_5$ film can be considered to be a pseudo binary mixed crystal expressed as $(GeTe)_2(Sb_2Te_3)_1$ consisting of (GeTe) and ($Sb_2Te_3$). This film in an amorphous state is assumed to have a structure as follows.

Generally, a CRN (covalent random network) model and a COCRN (chemically ordered covalent random network) model have been proposed as an amorphous structure of germanium chalcogenide. The CRN model is premised on the assumption that atoms are continuously bonded randomly. The COCRN model is based on a continuous structure having a chemical order, considering that a chemical bonding is formed between Ge and X (chalcogenide). It is also reported that an amorphous $Ge_xTe_{1-x}$ film whose composition is expressed as $GeTe_2$ has spectrum reflecting vibrations of tetrahedral cluster molecules ($GeTe_4$) in each of which Te atoms are arranged at the apexes of a regular tetrahedron at the center of which a Ge atom exists.

An $SbTe_3$ cluster molecular model in which a similar chemical bond is present can be assumed for Sb—Te as antimony chalcogenide. This is a structure in which three Te atoms bind together around an Sb atom. If GeSbTe has a molecular cluster as its basic lattice structure, GeSbTe can be considered to be formed of molecular clusters of $GeTe_4$ and $SbTe_3$. This can be considered that the individual clusters are bonded via Te atoms. That is, the structure can be expressed as —($SbTe_3$)($GeTe_4$)—($GeTe_4$)($SbTe_3$)—. It can be assumed that the scattering band of the Raman spectrum of the molecular clusters as a whole appears on the side of wave numbers smaller than at least the wave number of the vibration spectrum of each individual molecular cluster. This is so because the mass of the molecular clusters as a whole is larger than that of each molecular cluster.

The Raman spectra of the individual molecular clusters will be examined below.

It is agreed that crystalline $GeTe_2$ does not exist at equilibrium because it is decomposed by disproportionation: $GeTe_2 \rightarrow GeTe+Te$. However, it is reported that crystalline $GeTe_2$ for a metastable purpose exists thermodynamically, it is reported that the Raman spectrum of amorphous $GeTe_2$ (=$Ge_{33}Ge_{67}$) gives broad bands at 125 $cm^{-1}$ and 155 $cm^{-1}$. Of these bands, the band at 125 $cm^{-1}$ is considered to be caused by a $GeTe_4$ molecular cluster, and its half-width is known to reduce by a heat treatment. The band at 155 $cm^{-1}$ can be considered to be attributed to vibrations of amorphous Te or a $GeTe_4$ molecular cluster.

It is known that when laser light is radiated onto a $GeTe_2$ film to crystallize it at 180° C. for nine hours, the half-width of the scattering peak at 125 $cm^{-1}$ reduces and the scattering peak at 155 $cm^{-1}$ disappears, the behavior of which has been described in reference (b) cited in p. 16. From this fact, the present inventors presume that the contribution of the Raman band of amorphous Te is present in the band at 155 $cm^{-1}$. It is known that amorphous $GeTe_2$ is decomposed into crystalline Te and GeTe by disproportionation, and it is reported that two scattering peaks at 120 $cm^{-1}$ and 140 $cm^{-1}$ appearing after a heat treatment at 250° C. for five hours are attributed to the Raman band as crystalline Te. However, the Raman band as crystalline GeTe has not been mentioned at all.

Crystalline GeTe is known to have α and β phases, and the Raman spectrum in the former crystalline phase has been reported. According to this report, Raman bands are given at 140 $cm^{-1}$ and 100 $cm^{-1}$. It can be assumed that the bands of crystalline Te and crystalline GeTe may be superposed on the 140 $cm^{-1}$ band.

Referring to the Raman spectra shown in FIG. 3, a band at 125 to 127 $cm^{-1}$ is present as a common scattering peak in all samples. It can be considered from the above discussion that this band is due to the Raman band of a $GeTe_2$ phase consisting of $GeTe_4$ molecular cluster. This $GeTe_2$ phase is consequently found to be a non-equilibrium phase not existing in crystal. In addition, a broad scattering peak at 145 to 150 $cm^{-1}$ is present in all the samples. Although this band can be divided into several bands, it was found that the band had a scattering peak at 142 $cm^{-1}$. It can be considered that this band is attributed to the band at 140 $cm^{-1}$ found in crystalline GeTe and reflects $A_1$ vibrations in an NiS structure (rhombohedrically deformed NaCl).

From the above discussion, it is found to be able to consider that not only an amorphous GeTe phase as a non-equilibrium phase of an intermetallic compound represented by a composition $Ge_{50}Te_{50}$ but also an amorphous phase of $GeTe_2$ which is a composition not existing in a crystal as an equilibrium phase are present in an amorphous GeSbTe film.

An $Sb_2Te_3$ phase which has not been touched upon in the above discussion will be described below. Although no Raman spectrum as amorphous $Sb_2Te_3$ has been reported yet, its crystalline state is known. That is, bands were observed at 165 (151) $cm^{-1}$, 112 (116) $cm^{-1}$, and 69 (72.5) $cm^{-1}$ (numbers in parentheses indicate calculated values). Even in an amorphous state, therefore, Raman bands can be assumed to appear near these wave numbers if the atomic arrangement remains unchanged from that of a crystal. For the band at 165 $cm^{-1}$, overlapping with a band attributed to another bond on the large-wave-number side is found in the measurements so far. Therefore, it is only possible to infer that this bond is also present.

Figure 4:
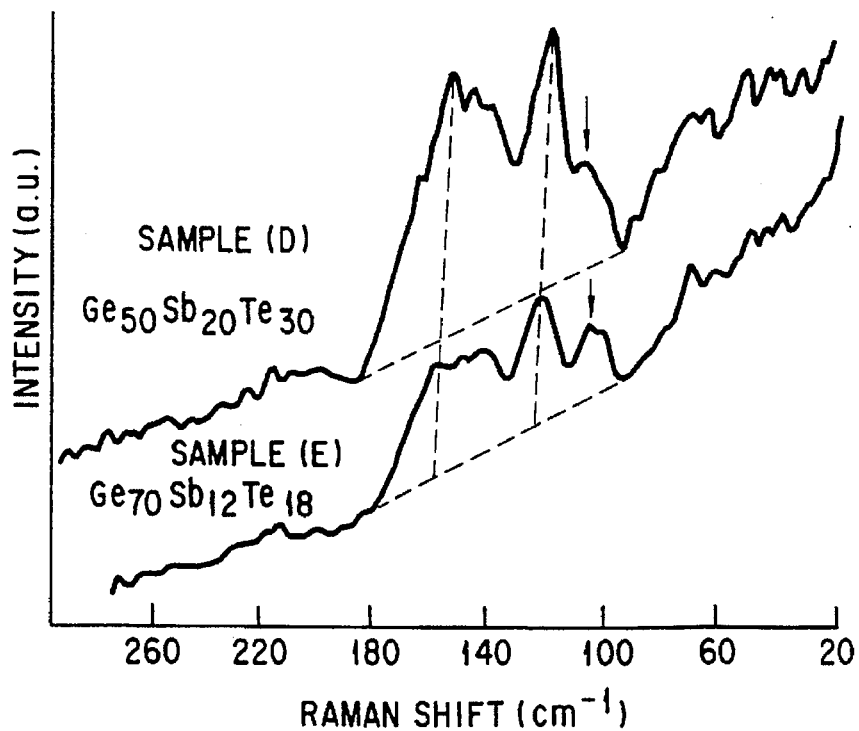

FIG. 4 shows the Raman spectra of GeSbTe films in a composition region largely different from a composition $Ge_{22}Sb_{22}Te_{56}$. More specifically, the compositions are $Ge_{50}Sb_{20}Te_{30}$ (sample D) and $Ge_{70}Sb_{12}Te_{18}$ (sample E).

As shown in FIG. 4, scattering peaks are present near 150 $cm^{-1}$ and 125 $cm^{-1}$, and the assignments of these bands are as described above. FIG. 4 also reveals that another band appears near 110 $cm^{-1}$. The peak intensity of this band increases with an increasing Ge quantity. From this fact, this band can be considered to be attributed to a cluster structure, such as $Ge(Te_3Ge)$ or $Ge(Te_2Ge_2)$, in which Te atoms substitute Ge atoms in a $GeTe_4$ molecular cluster.

Amorphous Ge is known to exhibit broad Raman bands at 275 $cm^{-1}$ and 100 $cm^{-1}$, and the intensity is higher at 275 cm$^{-1}$. Therefore, if the assignment is to amorphous Ge, it can be assumed that a Raman band also appears at 275 cm$^{-1}$. However, no Raman band is found at this position, so this is not amorphous Ge. The Raman spectra of amorphous Ge$_{1-x}$S$_x$ films have been reported. In a composition shifted from GeS$_2$ to the composition having an excess of Ge, a new band is found on the small-wave-number side in addition to a band resulting from vibrations of a GeS$_4$ molecular cluster. This band is attributed to vibrations of an S$_3$Ge—GeS$_3$ molecular cluster having a Ge—Ge bond. Therefore, it is considered to be safe to assume that this is true for the bands (indicated by arrows in FIG. 4) at 100 cm$^{-1}$ in the samples shown in FIG. 4. However, since a complete structure of a cluster molecule consisting of Ge and Te cannot be identified, this can be considered to be a mixed phase, such as Ge(Te$_3$Ge) or Ge(Te$_2$Ge$_2$).

By focusing attention on the peak intensity of the scattering peak at 150 cm$^{-1}$ and the peak intensity of the scattering peak at 125 cm$^{-1}$, the relative Raman band intensity ratio was obtained for each composition. The results were as follows.

|     | Composition | R.I. |
| --- | --- | --- |
| (A) | Ge$_{20}$Sb$_{20}$Te$_{60}$ | 1.4 |
| (B) | Ge$_{30}$Sb$_{20}$Te$_{50}$ | 1.4 |
| (C) | Ge$_{20}$Sb$_{30}$Te$_{50}$ | 0.75 |
| (D) | Ge$_{50}$Sb$_{20}$Te$_{30}$ | 1.1 |
| (E) | Ge$_{70}$Sb$_{12}$Te$_{18}$ | 0.78 |
| (F) | Ge$_{21}$Sb$_{24}$Te$_{55}$ | 1.7 |
| (G) | Ge$_{34}$Sb$_{19}$Te$_{47}$ | 1.2 |
| (H) | Ge$_{19}$Sb$_{19}$Te$_{62}$ | 1.0 |

In the above table, R.I.=(peak intensity near 150 cm$^{-1}$)/(peak intensity near 125 cm$^{-1}$).

Figure 5:
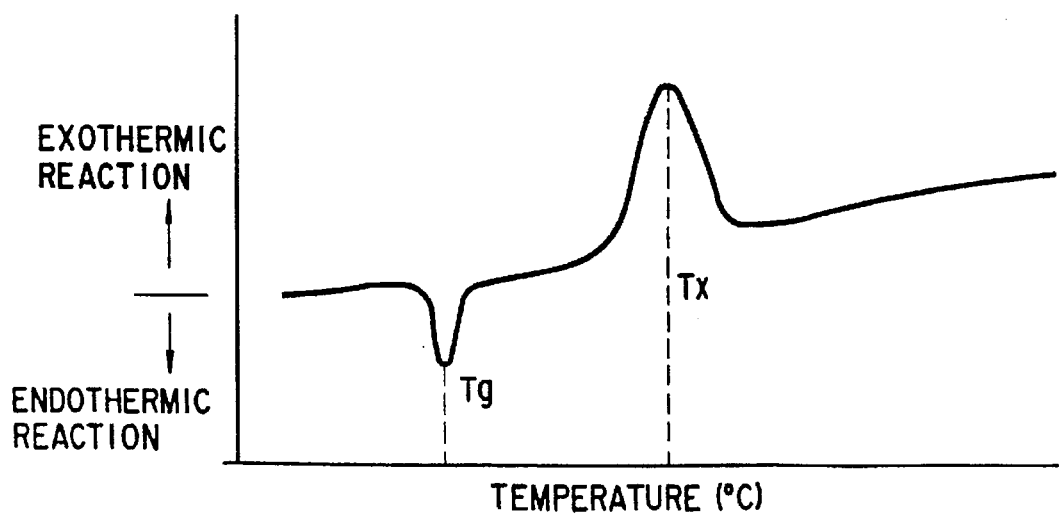
FIG. 5 is a typical graph showing the result of DSC measurement performed for GeSbTe films.

Thermal analysis was performed for the samples having the above compositions (A) to (H) by using a DSC (Differential Scanning Calorimeter). The result is shown in FIG. 5. Each sample was made by forming a film made of one of the compositions (A) to (H) to have a thickness of a few hundred nanometers on cover glass. The thermal analysis was done by heating each sample from room temperature at a scanning rate of 10° C./min. In the analysis, the exothermic peak temperature shown in FIG. 5 was defined to be the crystallization temperature (Tx). In FIG. 5, reference symbol Tg indicates the glass transition temperature.

In addition, Kissinger plot was performed from the crystallization temperatures obtained with at least three different scanning rates, thereby obtaining the crystallization energy. The results are given in a table below.

|     | Composition | Crystallization Temperature (°C.) | Crystallization Energy (eV) |
| --- | --- | --- | --- |
| (A) | Ge$_{20}$Sb$_{20}$Te$_{60}$ | 152 | 2.5 |
| (B) | Ge$_{30}$Sb$_{20}$Te$_{50}$ | 191 | 2.6 |
| (C) | Ge$_{20}$Sb$_{30}$Te$_{50}$ | 181 | 2.7 |
| (E) | Ge$_{70}$Sb$_{12}$Te$_{18}$ | 335 | 4.0 |
| (F) | Ge$_{21}$Sb$_{24}$Te$_{55}$ | 164 | 2.4 |
| (G) | Ge$_{34}$Sb$_{19}$Te$_{47}$ | 210 | 2.7 |
| (H) | Ge$_{19}$Sb$_{19}$Te$_{62}$ | 157 | 2.5 |

Figure 6:
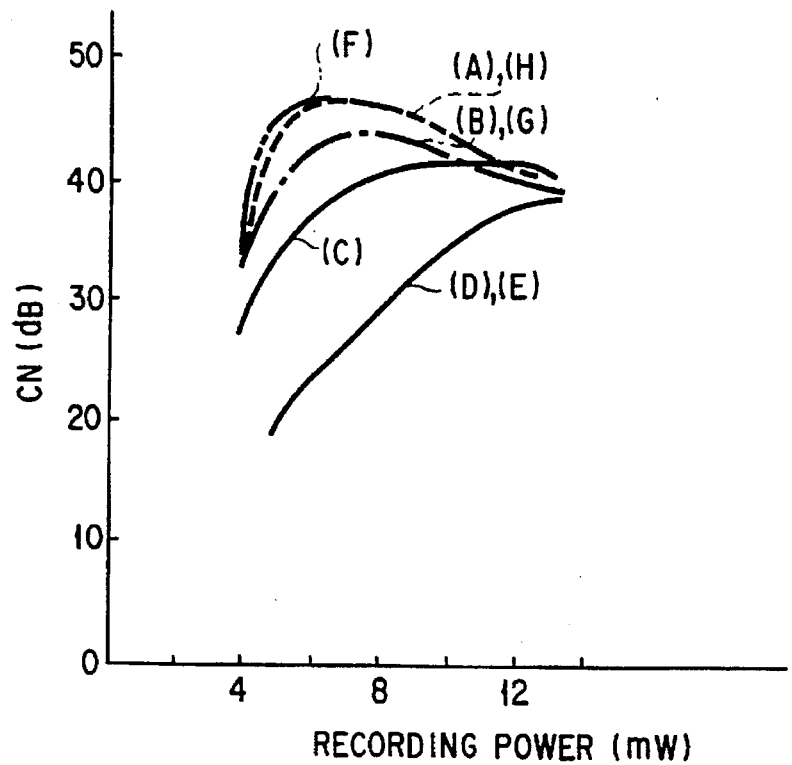
FIG. 6 is a graph showing the recording sensitivities of information recording media having GeSbTe films as recording films having several different compositions.

FIG. 6 is a graph showing the recording sensitivities when optical recording was actually performed. Each recording sensitivity was evaluated by the CN (carrier-to-noise) ratio as a function of recording power. The measurement conditions were a linear velocity of 14 m/s, a recording frequency of 8.8 MHz, and a laser wavelength of 780 nm, and the resolution of a spectrum analyzer was set at 30 kHz. Each sample was manufactured by forming a mixed protective film made of ZnS and SiO$_2$ on a polycarbonate substrate, forming a first recording film made of one of the above compositions (A) to (H) and having a thickness of a few hundred nanometers on the mixed protective film, forming a second recording film made of a BiTe alloy on the first recording film, and forming a mixed protective film made of ZnS and SiO$_2$ on the second recording film.

As can be seen from FIG. 6, the samples with the compositions (A), (B), and (F) to (H) had high recording sensitivities, and the samples with the compositions (C) to (E) had low recording sensitivities. In particular, the samples with the compositions (D) and (E) are unsuitable as the material of a recording film of a recording medium since the maximum values of CN are low.

Consequently, it is found that when a method of alloying a two-layered recording film is to be used as a recording method, a GeSbTe film whose composition is shifted from the composition of an intermetallic compound Ge$_{22}$Sb$_{22}$Te$_{56}$ to the composition having an excess of Ge and Te is suitable as the first recording film. Therefore, it is found that there is no correspondence between the composition of the GeSbTe film as the first recording film, the physical values of the recording film, and the thermal characteristic values as mentioned above. Since the crystallization temperature (Tx) can be considered to indicate the rate of change in atomic arrangement before the GeSbTe film and the second recording film are alloyed, it is possible to infer that a sample having a lower crystallization temperature has a higher recording sensitivity. However, the recording sensitivity of the sample with the composition (C) containing an excess of Sb is obviously lower than that of the sample with the composition (A) or the composition (B). It is therefore found that the use of the crystallization temperature as an index of the recording sensitivity is inadequate. It is also found that the use of the crystallization energy as an index of the recording sensitivity is unsuitable, since there is no large difference in crystallization energy between the sample with the composition (A) and the sample with the composition (C).

In addition, comparing the sample having the composition (E) with the samples having the compositions (A) to (C) shows that there is a clear correspondence of the crystallization temperature or the magnitude of the crystallization energy with the recording sensitivity. However, since the sample having the composition (E) has a low maximum CN value, the correspondence has no practical meaning.

A correspondence of the spectrum intensity with the recording sensitivity as the characteristic feature of a Raman scattering spectrum will be described below. That is, the samples with the compositions (A) and (B) had an R.I. value of 1.4. On the other hand, although the sample with the composition (D) had an R.I. value of 1.1, another Raman band appeared at 110 cm$^{-1}$, which was not present in the samples with the compositions (A) to (C) and is assumed to reduce the recording sensitivity. Therefore, the conditions for an index of the recording sensitivity are that the R.I. value is at least 1 and no Raman band exists at 110 cm$^{-1}$. By using this performance index, it is readily possible to determine the composition range of GeSbTe suitable as a recording film of an information recording medium.

(Second Embodiment)

How the structure of a GeSbTe film in an amorphous state is structurally associated with the crystalline state in each of a write once type optical recording method and an overwrite type optical recording method will be described in detail below.

(1-1) Manufacture of samples for Raman spectrum measurement

Figure 7:
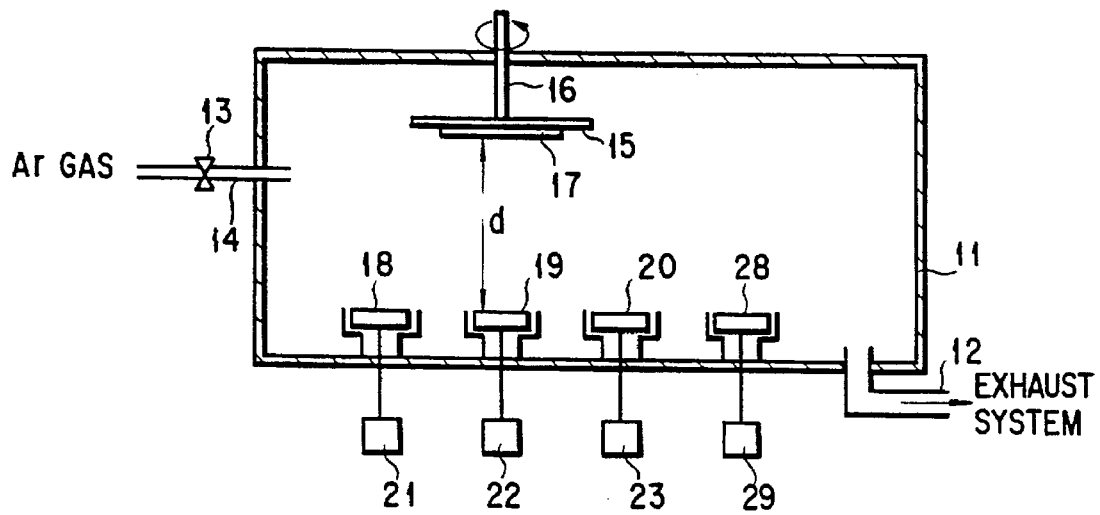

Samples were manufactured by using a sputtering apparatus shown in FIG. 7. The sputtering apparatus in FIG. 7 includes an Al alloy target 28 and a radio-frequency (RF) power applying means 29 connected to this Al alloy target 28 in addition to the arrangement of the sputtering apparatus illustrated in FIG. 1. Therefore, the same reference numerals as in the sputtering apparatus in FIG. 1 denote the same parts in the sputtering apparatus in FIG. 7, and a detailed description thereof will be omitted. In targets 18 to 20 and the target 28, a so-called magnetron sputtering mode (not shown) in which Ar plasma is confined near the target so that the plasma on the cathode target does not cover a substrate 17 was used. In this mode, the strength of a magnetic field need only be several hundred gausses or more. Four-inch targets were used as all of these targets. A distance $d$ between each target and the substrate was 110 mm.

Samples for Raman spectrum measurement were manufactured by using the sputtering apparatus with the above arrangement. That is, by setting the internal pressure of a chamber at 0.67 Pa and applying an RF power of 70 W from an RF power applying means 22 to the GeSbTe alloy target 19, a GeSbTe alloy was sputtered to have a film thickness of at least 100 nm on the substrate 17 mounted on a substrate support plate 15 having a rotating mechanism. A silicon substrate was used as the substrate 17. All compositions herein mentioned are the compositions of alloys used as the sputtering targets, and the composition difference from each target was within a few percents even when the formed film was analyzed. Sputtering for forming a GeTe film and an $Sb_2Te_3$ film for comparison was performed under the same conditions by switching the alloy target to the GeSbTe alloy target 19. Although the RF power applying means was used in this embodiment, it is also possible to use a DC power supply in sputtering for the GeSbTe alloy target 19.

Figure 8:
FIG. 8 is a sectional view showing a sample for Raman spectrum measurement.

As shown in FIG. 8, a GeSbTe film 31 was formed on a silicon substrate 30 in the sample after the film formation. Following the same procedures as mentioned above, a Ge—Te film and an Sb—Te film were formed on silicon substrates.

(1-2) Manufacture of samples of write once type information recording medium

Figure 9:
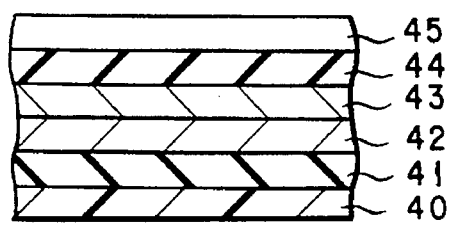
FIG. 9 is a sectional view showing a sample of a write once type information recording medium.

A sample of a write once type information recording medium illustrated in FIG. 9 was manufactured by using the sputtering apparatus in FIG. 7. First, a $ZnS/SiO_2$ alloy was sputtered by applying an RF power of 100 W from an RF power applying means 21 to the $ZnS/SiO_2$ alloy target 18, forming a 20-nm thick $ZnS/SiO_2$ film 41 as a protective film on a polycarbonate substrate 40. Then, a chamber 11 was evacuated to set the internal pressure at $1.2\times10^{-3}$ Pa or less than that by using an exhaust system, and Ar gas was again introduced into the chamber. Thereafter, a GeSbTe alloy was sputtered by applying an RF power of 70 W from an RF power applying means 22 to the GeSbTe alloy target 19, forming a 40-nm thick GeSbTe film 42 on the $ZnS/SiO_2$ film 41.

Subsequently, the chamber 11 was evacuated to set the internal pressure at $1.2\times10^{-3}$ Pa or less than that by using the exhaust system, and Ar gas was again introduced into the chamber. Thereafter, a BiTe alloy was sputtered by applying an RF power of 70 W from an RF power applying means 23 to the BiTe alloy ($Bi_2Te_3$ alloy) target 20, forming a 35-nm thick BiTe film 43 on the GeSbTe film 42. Subsequently, the chamber 11 was evacuated to set the internal pressure at $1.2\times10^{-3}$ Pa or lower by using the exhaust system, and Ar gas was again introduced into the chamber. Thereafter, following the same procedures as described above, a 20-nm thick $ZnS/SiO_2$ film 44 was formed as a protective film on the BiTe film 43. Lastly, the resultant structure was taken out from the chamber 11, and an ultraviolet-curing resin was spin-coated on the $ZnS/SiO_2$ film 44. The resin was then ultraviolet-cured to form a resin layer 45 with a thickness of a few microns. All of the compositions herein mentioned also are the compositions of the sputtering targets, and the composition difference from the alloy of each target was within a few percents even when the formed film was analyzed.

Although the RF power applying means were used in this embodiment, it is also possible to use DC power supplies except for the formation of the $ZnS/SiO_2$ film. However, the alloys used in this embodiment show characteristics similar to those of a semiconductor when film formation is performed by sputtering. Therefore, it is possible to perform sputtering more stably by using an RF power. In addition, although the polycarbonate substrate was used as the substrate, it is also possible to use a substrate made of, e.g., polymethylmethacrylate (PMMA) or an amorphous polyolefin resin (APO), or a glass substrate, provided that the substrate is transparent with respect to the wavelength of laser light to be used.

In recording using an information recording medium, it is desirable that the angle of tilt of the medium be small. This is so because if the medium is tilted, the value of an effective recording power decreases, and this makes it impossible to obtain a sufficient recording sensitivity. The allowable range of this tilt angle increases as the thickness of the substrate decreases. However, the allowable range of the tilt angle is not particularly limited if the thickness is one by which a practical mechanical strength and molding are possible. In this embodiment, the wavelength of a semiconductor laser was 780 nm, and a numerical aperture NA of an objective lens for focusing laser light was 0.55. Therefore, the thickness was set to 1.2 mm because the allowable tilt angle could be set at about 5 mrad. It is found from optical calculations that, if the wavelength of a semiconductor laser to be used is shortened to 650 nm, the allowable inclination angle is 5 mrad or less when the substrate thickness is 1.2 mm. Therefore, a tilt angle margin of about 5 mrad can be maintained by decreasing the substrate thickness to be smaller than 1.2 mm, e.g., about 0.8 to 0.5 mm. In addition, if it is desirable to essentially improve the mechanical characteristics (including the tilt angle) of a medium, the tilt angle can be maintained by adhering single-plate media each other.

(1-3) Manufacture of samples of overwrite type information recording medium

Figure 10:
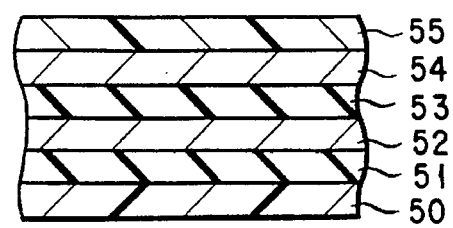
FIG. 10 is a sectional view showing a sample of an overwrite type information recording medium.

A sample of an overwrite type information recording medium illustrated in FIG. 10 was manufactured by using the sputtering apparatus in FIG. 7. First, a $ZnS/SiO_2$ alloy was sputtered by applying an RF power of 100 W from the RF power applying means 21 to the $ZnS/SiO_2$ alloy target 18, forming a 150-nm thick $ZnS/SiO_2$ film 51 as a protective film on a polycarbonate substrate 50. After the chamber 11 was evacuated to set the internal pressure at $1\times10^{-3}$ Pa or less than that by using the exhaust system, Ar gas was again introduced into the chamber. Thereafter, a GeSbTe alloy was sputtered by applying an RF power of 70 W from the RF power applying means 22 to the GeSbTe alloy target 19, forming a 20-nm thick GeSbTe film 52 on the $ZnS/SiO_2$ film 51.

Subsequently, the chamber 11 was evacuated to set the internal pressure at $1.2\times10^{-3}$ Pa or less than that by using the exhaust system, and Ar gas was again introduced into the chamber. Thereafter, following the same procedures as described above, a 25-nm thick ZnS/SiO$_2$ film 53 was formed as a protective film on the GeSbTe film 52. Subsequently, the chamber 11 was evacuated to set the internal pressure at 1×10$^{-3}$ Pa or less than that by using the exhaust system, and Ar gas was again introduced into the chamber. Thereafter, an Al alloy was sputtered by applying an RF power of 400 W from the RF power applying means 29 to the Al alloy target 28, forming a 100-nm thick Al alloy film 54 as a reflective film on the ZnS/SiO$_2$ film 53. Lastly, the resultant structure was taken out from the chamber 11, and an ultraviolet-curing resin was spin-coated on the Al alloy film 54. The resin was then ultraviolet-cured to form a resin layer 55 with a thickness of a few microns. All of the compositions herein mentioned also are the compositions of the sputtering targets, and the composition difference from the alloy of each target was within a few percents even when the formed film was analyzed.

Although the RF power applying means were used in this embodiment, it is also possible to use DC power supplies except for the formation of the ZnS/SiO$_2$ films. However, the alloys used in this embodiment show characteristics similar to those of a semiconductor when film formation is performed by sputtering. Therefore, it is possible to perform sputtering more stably by using an RF power. In addition, although the polycarbonate substrate was used as the substrate, it is also possible to use a substrate made of, e.g., polymethylmethacrylate (PMMA) or an amorphous polyolefin resin (APO), or a glass substrate, provided that the substrate is transparent with respect to the wavelength of laser light to be used. Also, an Al alloy film added with about 3 at % of Mo in order to prevent oxidation was used as the reflective film. This is so because the reflectance changes largely due to oxidation if an Al film is used. To prevent oxidation, it is also possible to add about 3 at % of an element, such as Cr, W, Ti, or Zr.

In recording using an information recording medium, it is desirable that the angle of tilt of the medium be small. This is so because if the medium is tilted, the value of an effective recording power decreases, and this makes it impossible to obtain a sufficient recording sensitivity. The allowable range of this tilt angle increases as the thickness of the substrate decreases. However, the allowable range of the tilt angle is not particularly limited if the thickness is one by which a practical mechanical strength and molding are possible. In this embodiment, the wavelength of a semiconductor laser was 780 nm, and a numerical aperture NA of an objective lens for focusing laser light was 0.55. Therefore, the thickness was set to 1.2 mm because the allowable tilt angle could be set at about 5 mrad. It is found from optical calculations that, if the wavelength of a semiconductor laser to be used is shortened to 650 nm, the allowable tilt angle is 5 mrad or less when the substrate thickness is 1.2 mm. Therefore, a tilt angle margin of about 5 mrad can be maintained by decreasing the substrate thickness to be smaller than 1.2 mm, e.g., about 0.8 to 0.5 mm. In addition, if it is desirable to essentially improve the mechanical characteristics (including the tilt angle) of a medium, the inclination angle can be maintained by adhering single-plate media.

(2) Measurement of Raman scattering spectra

Raman scattering was measured by setting the power of an Ar ion laser (wavelength 514.5 nm) at 20 mW. The power was set as low as possible as long as a GeSbTe film was not crystallized by heat produced by absorption of laser light and signals could be obtained. The samples were measured at room temperature. The scan speed of a spectrum was 60 cm$^{-1}$/min, the measurement range was 20 to 380 cm$^{-1}$, and the data integrating number was 10 to 12 times.

(3) Raman spectra in amorphous state

Figure 11:
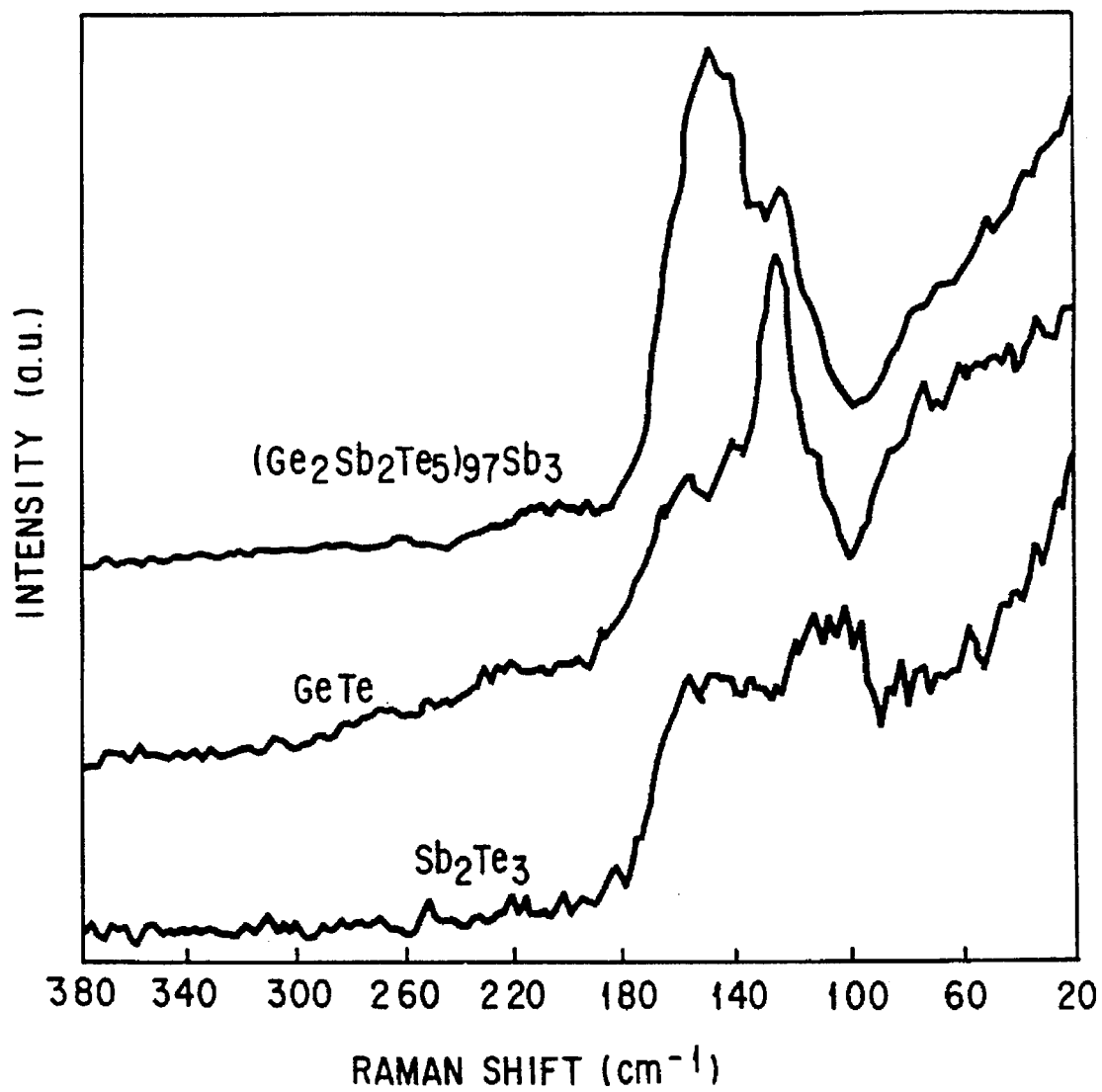
FIG. 11 is a graph showing Raman spectra in an amorphous state of GeSbTe and GeTe films, and an microcrystalline state of Sb$_2$Te$_3$ film.

FIG. 11 shows the Raman spectra of a (Ge$_2$Sb$_2$Te$_5$)$_{97}$Sb$_3$ film and a GeTe film in an amorphous state, and an Sb$_2$Te$_3$ film in a microcrystalline state. As can be seen from FIG. 11, a relatively sharp Raman band at 125 cm$^{-1}$ in the sample (Ge$_2$Sb$_2$Te$_5$)$_{97}$Sb$_3$ is also found in the GeTe film. Two broad Raman bands are found at 160 cm$^{-1}$ and 110 cm$^{-1}$ in the Raman spectrum of the Sb$_2$Te$_3$ film.

The Raman band of the amorphous GeTe$_2$ film is attributed to a vibration model in which a GeTe$_4$ cluster molecule is taken into account. That is, the structure of a GeTe$_4$ cluster molecule is considered to be a regular tetrahedral structure like that of a methane molecule, and the existence of four vibration modes, (Al) v1 as a totally symmetric vibration mode, (E) v2 vibration which is degenerated doubly, (F2) v3 vibration which is degenerated triply, and (F2) v4 vibration, is reported as the vibration model (G. B. Fisher, J. Tauc, and Y. Verhelle, "Proceedings of the 5th International Conference on Amorphous and Liquid Semiconductors," p. 1259 (1973)). Fischer et al. confirmed four bands at 100 cm$^{-1}$ or less, from 131 to 128 cm$^{-1}$, from 158 to 170 cm$^{-1}$, and from 210 to 230 cm$^{-1}$, by measuring Raman spectra over a composition range of Ge$_x$Te$_{1-x}$ (0.2<x<0.67). On the basis of the assignments of the vibration spectra of Ge tetrahalides (GeCl$_4$, GeBr$_4$, and GeI$_4$), Fischer et al., have made individual Raman peak assignments for Ge chalcogenides such as GeS$_4$, GeSe$_4$, and GeTe$_4$. Therefore, the Raman bands of GeTe$_4$ are attributed as shown in Table 1 below in accordance with the assignment of the GeI$_4$ molecular vibration.

TABLE 1

|  | v1 (A1) | v2 (E) | v3 (F2) | v4 (F2) |
| --- | --- | --- | --- | --- |
| GeI$_4$ | 159 | 60 | 264 | 80 |
| GeTe | 131 | 80 to 90 | 227 | 80 to 90 |

Fischer et al. have consider that the band from 158 to 170 cm$^{-1}$ found in GeTe in addition to the above Raman bands is due to a Te—Te bond, i.e., vibrations of amorphous Te, rather than vibrations of GeTe$_4$ cluster molecules.

From the above results, the present inventors have concluded that in the amorphous GeTe film, the band at 127 cm$^{-1}$ corresponds to the A$_1$ mode, the considerably broad band at 100 cm$^{-1}$ or less corresponds to the vibrations v2 and v4, and the band from 200 to 240 cm$^{-1}$ corresponds to v3. Raman bands are also found at 142 cm$^{-1}$ and 156 cm$^{-1}$. In an amorphous Te film, on the other hand, a band is found at the same wave number (M. H. Brodsky, R. J. Gambino, J. E. Smith, Jr., Y. Yacoby, Phys. Stat. Solidi, (b)52,609 (1972)). Therefore, this band can be considered to be caused by a Te—Te bond. The band at 142 cm$^{-1}$ can be considered to be caused by a Ge—Te bond as will be described in detail later.

Since the band at 125 cm$^{-1}$ of the amorphous GeSbTe film is almost equal to the vibrations at 127 cm$^{-1}$ of the amorphous GeTe film, this band can be considered to be caused by symmetric vibrations of GeTe$_4$ cluster molecules. The bands at 100 cm$^{-1}$ or less and at 210 cm$^{-1}$ are not as significant as in amorphous GeTe but found only very slightly (the relative intensity will be presented later from peak divided data). The peak of the band at 142 cm$^{-1}$ is also found in the amorphous GeSbTe film. In addition, a band with an intensity having a peak at 152 cm$^{-1}$, which is different from that of amorphous Te, also exists. This band is regarded as a spectrum in which the bands from 150 to 160 cm$^{-1}$ of amorphous GeTe and Sb$_2$Te$_3$ are superposed. The broad band at 110 cm$^{-1}$ of microcrystalline Sb$_2$Te$_3$ is almost not reflected on the spectrum of the amorphous GeSbTe film.

Figure 12:
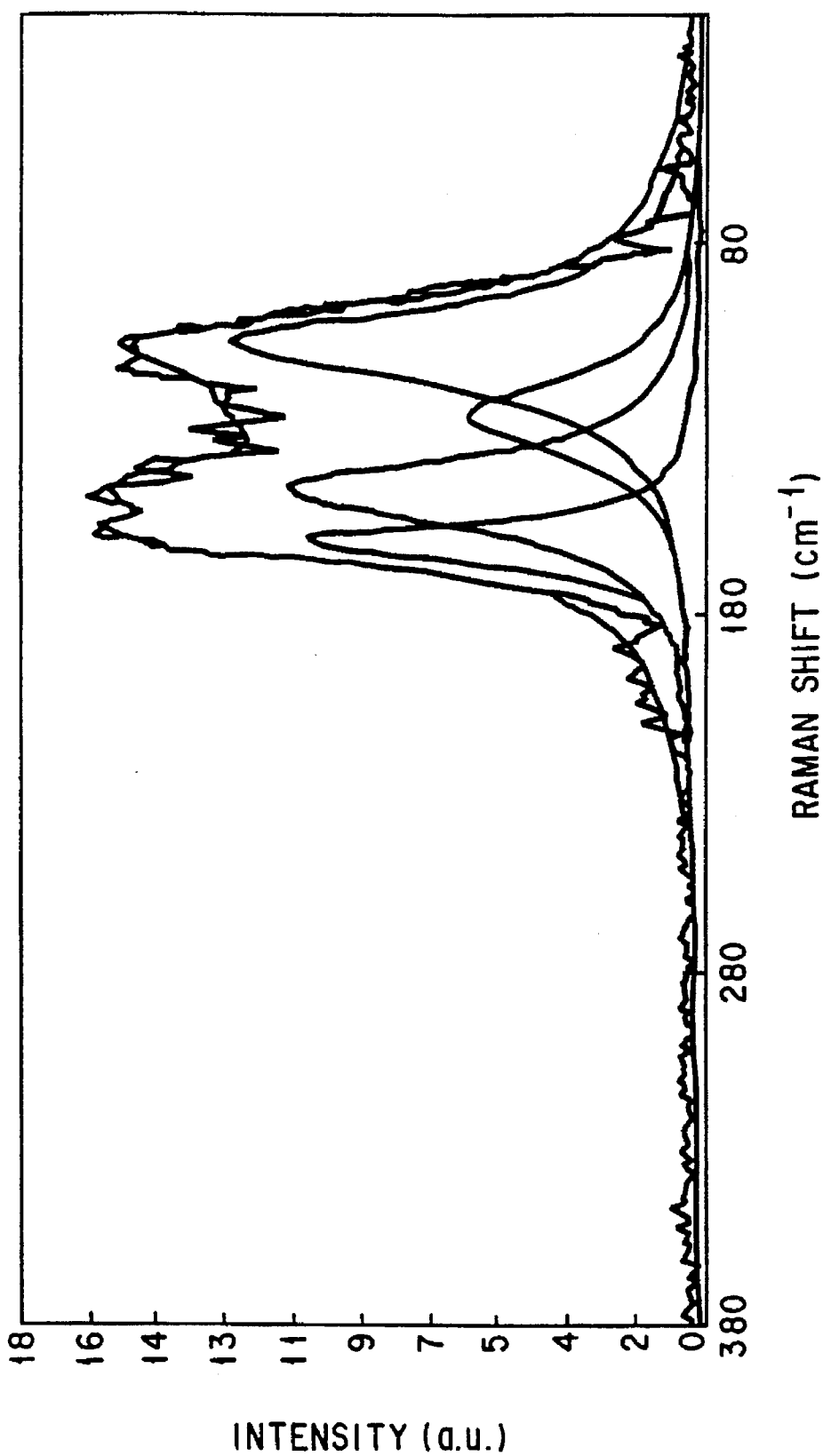
FIG. 12 is a graph showing the deconvoluted Raman spectrum divided into four bands of microcrystalline Sb$_2$Te$_3$ films.

Assuming that a molecular cluster model similar to that of GeTe$_4$ is also applicable to an Sb—Te system, an SbTe$_3$ type pyramid molecule is possible as the Raman spectrum of an amorphous Sb—Te system. Since vibrations of SbCl$_3$ are known (G. Herzberg, "Molecular Spectra and Molecular Structure, II. Infrared and Raman Spectra of Polyatomic Molecules," D. Van Nostrand Company, Inc., (1945), p. 164), analysis can be performed in the same fashion. FIG. 12 shows the result of peak deconvolution performed for the spectra in FIG. 11. On the basis of the result in FIG. 12, the wave number ratio is calculated by attributing the wave number obtained by peak deconvolution to each vibration. Consequently, as in Table 2 below, a relatively good agreement was found.

TABLE 2

|         | v1  | v2  | v3  | v4  | v3/v1 | v4/v2 |
|---------|-----|-----|-----|-----|-------|-------|
| SbCl$_3$ | 360 | 165 | 320 | 134 | 0.90  | 0.81  |
| SbTe$_3$ | 161 | 127 | 148 | 109 | 0.92  | 0.86  |

It can be therefore considered that the Raman band from 150 to 160 cm$^{-1}$ of the amorphous GeSbTe film appeared due to the contributions of the Te—Te bond of amorphous Te and the Sb—Te bond of microcrystalline Sb$_2$Te$_3$. In the Raman spectrum of a sample composed of Ge$_{50}$Sb$_{20}$Te$_{30}$ or Ge$_{70}$Sb$_{12}$Te$_{18}$, a spectrum reflecting a Ge—Ge bond was found near 110 cm$^{-1}$ in addition to the bonds of the above-mentioned clusters. This is a spectrum of a dimer in which Ge—Te cluster molecules bind together. Possible examples of the dimer cluster molecule in which GeTe$_4$ cluster molecules bind together are Te$_3$Ge—GeTe$_3$, (Te$_2$Ge)Ge—Ge(Te$_2$Ge), and (TeGe$_2$)Ge—Ge(TeGe$_2$), each having a symmetrical structure with a Ge—Ge bond, and a combination of dimers in which the arrangement of atoms bonded to Ge atoms of a Ge—Ge bond is asymmetrical.

(4) Polarized Raman spectra in amorphous state

The band at 131 cm$^{-1}$ reported by Fischer et al. cited in item (3) above corresponds to the band from 125 to 127 cm$^{-1}$ in this research, and it is also reported that this band has a degree of depolarization. The degree of depolarization is a value calculated by dividing the intensity of a Raman band measured with HV polarized light by the intensity of a Raman band measured with Vv polarized light. It is known that in the Raman band of a sample in which molecules give symmetrical vibrations, the depolarization ratio is 0.75 or less and is obviously smaller than values near that band. In Raman bands other than this band, the depolarization ratio takes values around 0.75. Therefore, it is possible to ascertain the symmetry of vibrations by measuring the spectrum of the depolarization ratio of a Raman band within a measurement wave number range. Fischer et al. has also reported that depolarization ratio of a band at 131 cm$^{-1}$ is about 0.40. This band is attributed to the symmetrical vibration (represented by A$_1$) mode also in respect of the depolarization ratio.

Figure 15:
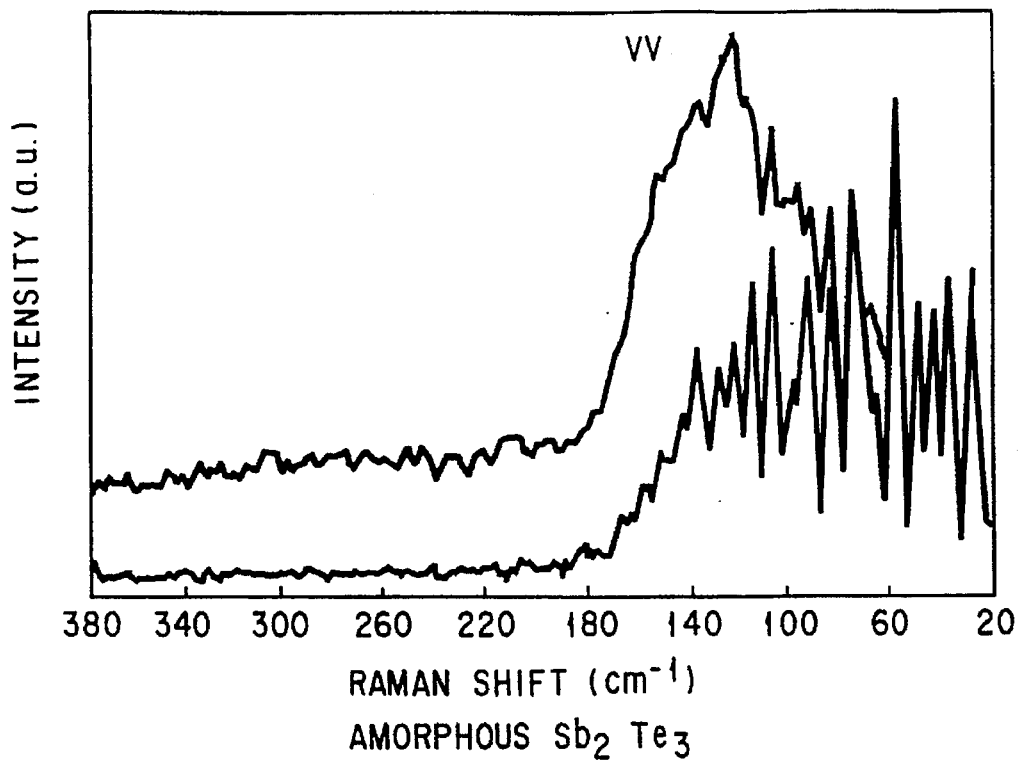
FIG. 15 is a graph showing the polarized Raman spectra of amorphous Sb$_2$Te$_3$.

FIGS. 13 to 15 show the polarized Raman spectra of GeSbTe, GeTe, and Sb$_2$Te$_3$, respectively. Since the scattering intensity of polarized Raman scattering is lower than the intensity of S+P polarized light normally measured, each sample was taken out from a vacuum cell to avoid the interference by rotational Raman bands to be brought about oxygen and nitrogen in air. That is, since the S/N ratio was expected to be lowered because the intensity of scattered light was reduced through an optical window of the vacuum cell, each sample was measured outside the vacuum cell in order to maximize the S/N ratio. Consequently, the rotational Raman band of oxygen or nitrogen in the air was superposed on Raman bands found at 100 cm$^{-1}$ or less in these spectra, since measurements were performed for samples placed in the air. Therefore, the spectrum of the air was calculated and subtracted from these spectra.

Figure 16:
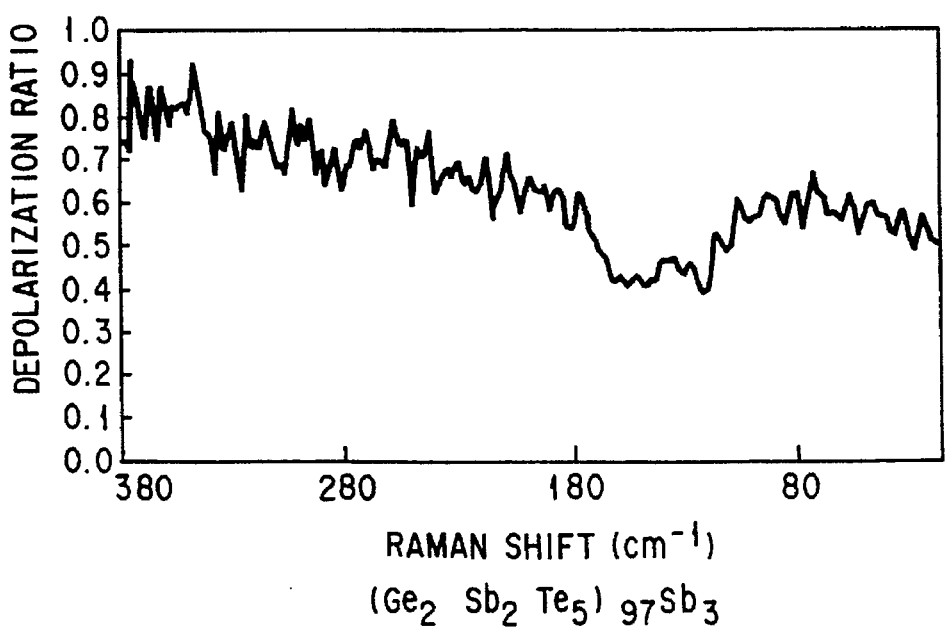
FIG. 16 is a graph showing the spectrum of the depolarization ratio of amorphous (Ge$_2$Sb$_2$Te$_5$)$_{97}$Sb$_3$.
Figure 17:
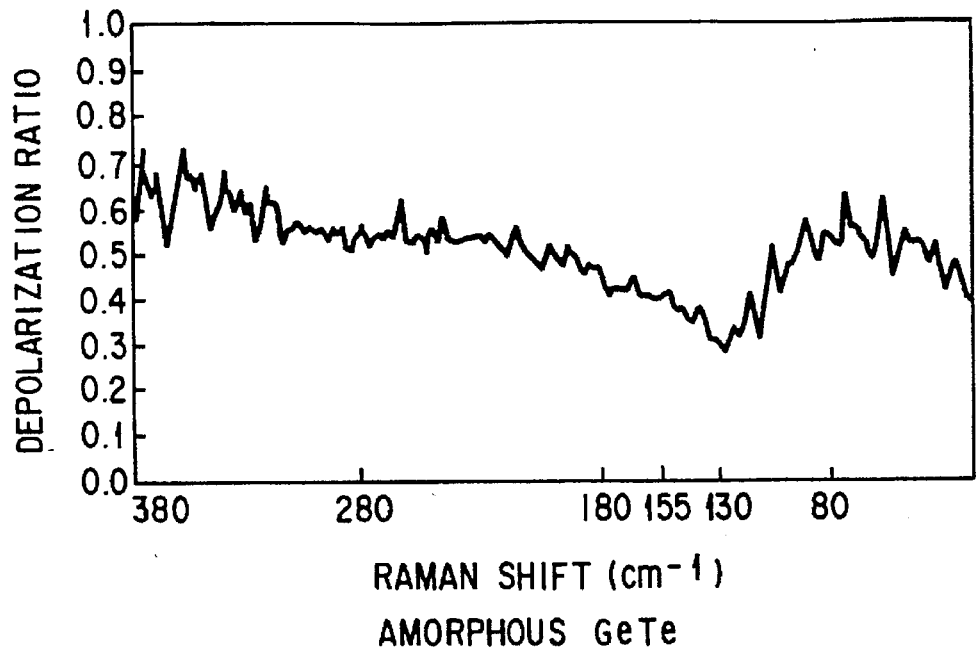
FIG. 17 is a graph showing the spectrum of the depolarization ratio of amorphous GeTe.
Figure 18:
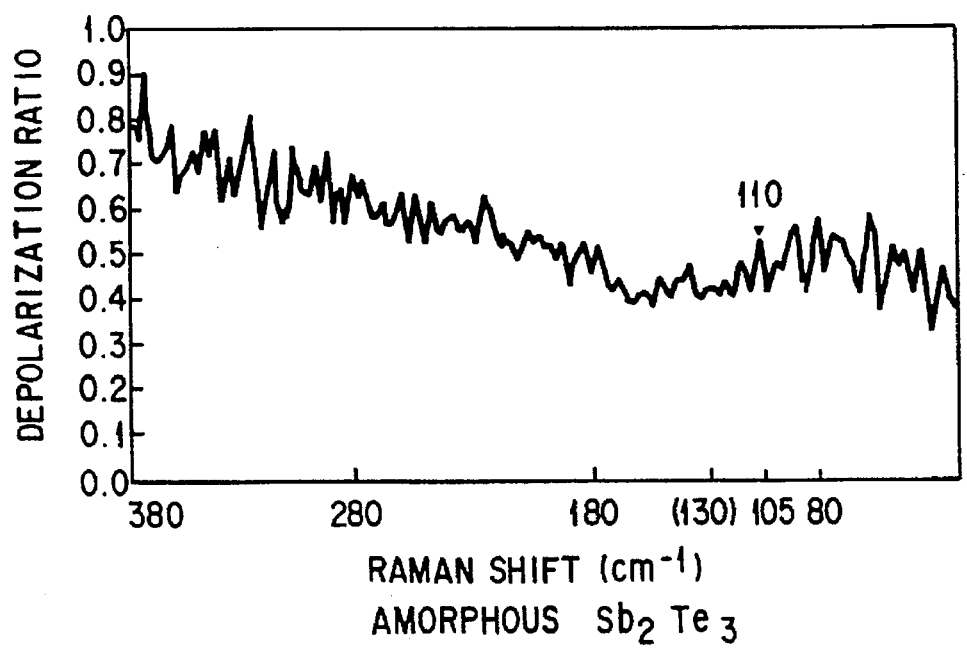
FIG. 18 is a graph showing the spectrum of the depolarization ratio of amorphous Sb$_2$Te$_3$.

FIGS. 16 to 18 show the calculation results of the depolarization ratio. From these results, it is apparent that depolarization ratios are present in two bands at 125 cm$^{-1}$ and 150 cm$^{-1}$ in a GeSbTe film. In a GeTe film, the degree of depolarization decreased to about 0.3 at a peak of 127 cm$^{-1}$. In an Sb$_2$Te$_3$ film, the degree of depolarization was 0.4 at 160 cm$^{-1}$.

From the above results, it can be considered that the peak at 127 cm$^{-1}$ of the GeTe film corresponds to the symmetrical vibration A$_1$ mode in a tetrahedral structure. It can also be considered that in the Te—Te bond from amorphous Te at 155 cm$^{-1}$, the peak at 121 cm$^{-1}$ which gives the symmetrical vibrations in the crystal structure is shifted to the high-frequency side. Therefore, if this peak at 155 cm$^{-1}$ is also a symmetrical vibration, it is predicted that this peak gives a degree of depolarization. In addition, the depolarization ratio of the band at 155 cm$^{-1}$ is about 0.4, which is larger than the depolarization ratio of the band at 127 cm$^{-1}$, and this band can be considered to give a degree of depolarization.

(5) Depolarization ratio of amorphous film

The depolarization ratio of the microcrystalline Sb$_2$Te$_3$ film is 0.4 near 161 cm$^{-1}$ and therefore can be considered to correspond to the symmetrical vibration A$_1$ mode. From the above fact, it can be considered that the depolarization ratio of the Raman band (155 cm$^{-1}$) of the amorphous GeSbTe film largely contributes to symmetrical vibrations of SbTe$_3$ cluster molecules. In addition, the Raman band at 125 cm$^{-1}$ of the amorphous GeSbTe film shows a clear depolarization ratio. This means that symmetrical vibrations with good symmetry are present in the amorphous GeSbTe film. That is, it can be considered that the presence of SbTe$_3$ cluster molecules has almost no influence on the vibrations of GeTe$_4$ cluster molecules in the amorphous GeSbTe film. In other words, it can be considered that the Raman band at 125 cm$^{-1}$ is not based on symmetrical vibrations of clusters having a new structure formed by mixing of Sb. If Sb is bonded, the wave number of a Raman band naturally changes. However, no change was found in the wave number of the Raman band. It is therefore safe to consider that the GeTe$_4$ cluster molecular structure is not altered by the presence of Sb.

(6) Raman spectra of crystallized samples

Figure 19:
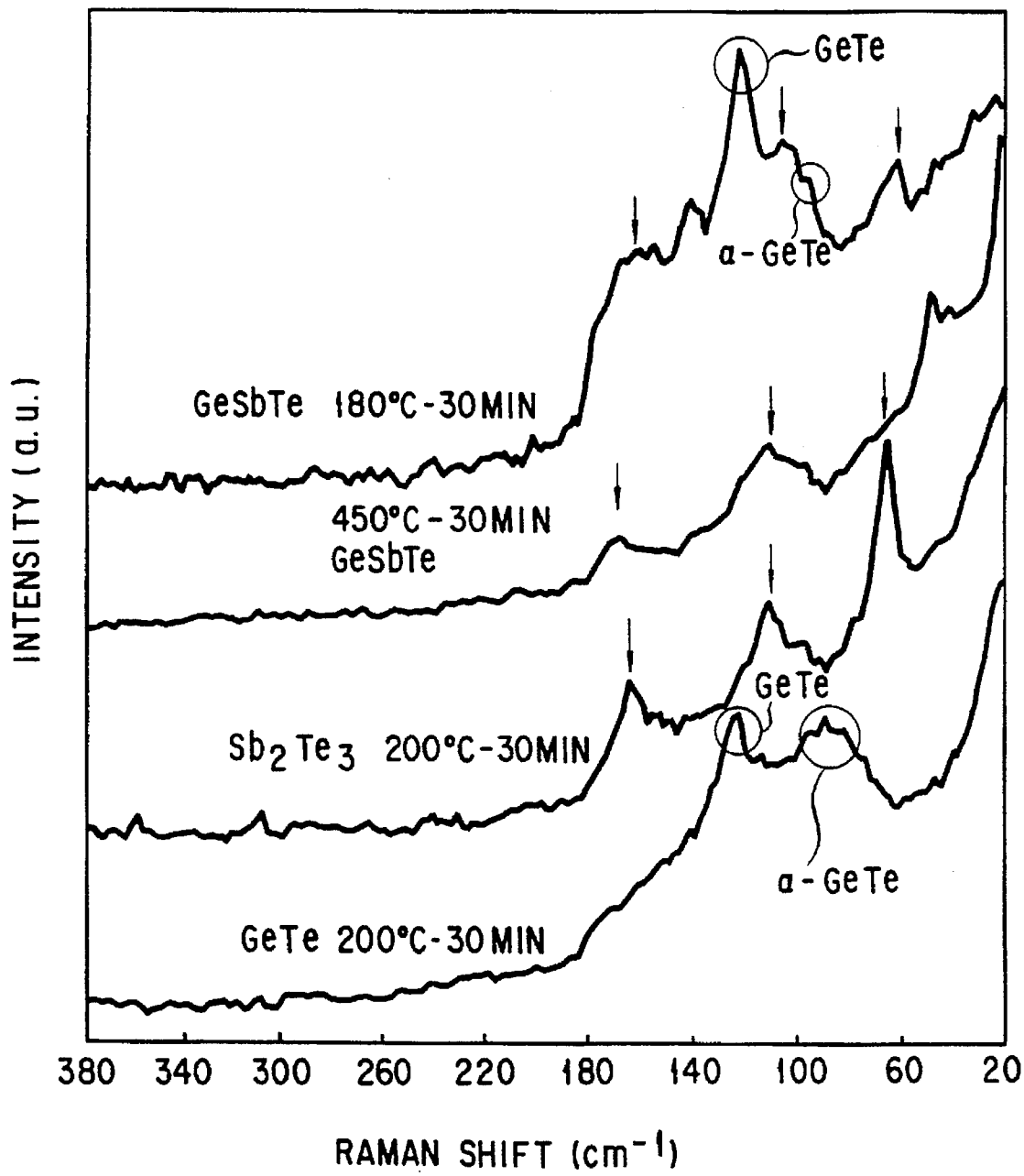
FIG. 19 is a graph showing the Raman spectra of crystallized samples.

FIG. 19 shows the Raman spectra of samples crystallized under several different heat treatment conditions. All these samples were measured directly after DSC measurements to uncover their thermal histories. As samples of an amorphous GeSbTe film, a sample heated to 180° C. at a heating rate of 2° C./min and held at that temperature for 30 minutes and a sample heated to 450° C. at a heating rate of 10° C./min and held at about 460° C. for 30 minutes were used. The DSC results are shown in Table 3 below.

TABLE 3

|          | Scan Speed (°C./min) | Tg(°C.) | Tx(°C.)      |
|----------|----------------------|---------|--------------|
| GeTe     | 2                    | 146.9   | 191.4        |
| Sb$_2$Te$_3$ | 2                | 146.9   | Not observed |
| GeSbTe   | 2                    | 146.4   | 154.4        |
| GeSbTe   | 10                   | 147.7   | 165.1        |

In the process of heating the amorphous GeSbTe samples, 180° C. corresponds to a temperature immediately after the lower crystallization temperature in two crystallization steps, and 459° C. corresponds to a spectrum when crystallization is completely done. The spectra of GeTe and $Sb_2Te_3$ samples were obtained by heating the two samples at a heating rate of 2° C./min and crystallizing them at their respective temperatures.

As can be seen from FIG. 19, a broad band at 160 $cm^{-1}$ and bands at 106 $cm^{-1}$ and 65 $cm^{-1}$ newly appear in the GeSbTe film treated at 180° C. In addition, the band at 125 $cm^{-1}$ still exists. The band at 145 $cm^{-1}$ becomes clearer although it also exists as the shoulder of the band having a peak at 150 $cm^{-1}$ in the spectrum in an amorphous state.

X-ray diffraction for an amorphous GeSbTe film at room temperature was performed in advance to confirm that no diffraction peak from crystalline Te was present. In addition, a GeSbTe film showed a clear crystallization peak at 154° C. when heated from room temperature in differential scanning calorimetry (DSC), so it was confirmed that the film was in an amorphous state at room temperature. Therefore, the band at 125 $cm^{-1}$ is the Raman band of $GeTe_4$ cluster molecules rather than the Raman band of crystalline Te. The band at 145 $cm^{-1}$ also cannot be considered to be the band of crystalline Te, since this band also exists in an amorphous state.

It is reported that crystalline $Sb_2Te_3$ has bands at 165 $cm^{-1}$ and 69 $cm^{-1}$, as an $A_{1g}$ mode, and shows a band at 112 $cm^{-1}$, as an Eg band (W. Richter, H. Koehler, and C. R. Becker, Phys., Stat., Sol., (b) 84, 619 (1977)). These three bands were found in the spectrum of an $Sb_2Te_3$ film crystallized at 200° C. and agreed well with the reported values. Therefore, it can be considered that the broad band at 160 $cm^{-1}$ and the bands at 106 $cm^{-1}$ and 65 $cm^{-1}$ of the GeSbTe film crystallized at 180° C. were due to crystalline $Sb_2Te_3$. Amorphous Te is crystallized at a temperature of 180° C. Therefore, it can be assumed that the intensity of the Raman band at 160 $cm^{-1}$ of the GeSbTe film crystallized at that temperature reduced because the contribution of vibrations of amorphous Te disappeared.

In the spectrum of the GeTe film crystallized at 200° C., the band at 125 $cm^{-1}$ still existed, although its intensity was decreased to be lower than that in an amorphous state. However, a new broad band appeared at 90 $cm^{-1}$. Two crystalline phases are present in crystalline GeTe; that is, the phase is an α-GeTe phase and shows a rombohedrically deformed NaCl structure at low temperatures, and changes to a β-phase to form an NaCl structure at high temperatures (352° C.). It is already found that the α-GeTe phase as a low-temperature phase alone is Raman active and shows two bands at 140 $cm^{-1}$ and 98 $cm^{-1}$ (E. F. Steingmeier and G. Harbeke, Solid State Commun., vol. 8, pp. 1275-1279, (1970)). Since the β phase at high temperatures is Raman inactive and active only to infrared spectrum no Raman band is present in the Raman spectrum. The Raman band of the α-GeTe phase is temperature-dependent, so its wave number decreases as the temperature rises. In addition, the peaks shift to 125 $cm^{-1}$ and 90 $cm^{-1}$ at around room temperature, 300 K. (E. F. Steingmeier and G. Harbeke, Solid State Commun., Vol. 8, pp. 1275-1279, (1970)). Therefore, the Raman spectrum of the GeTe film crystallized at 200° C. can be considered to exhibit the Raman of the α-GeTe phase.

No band is found at 90 $cm^{-1}$ in the Raman spectrum of the GeSbTe film crystallized at 180° C. Therefore, it can be assumed that the band at 125 $cm^{-1}$ is the symmetrical vibration $A_1$ mode of $GeTe_4$ cluster molecules.

Note that although the crystallization mechanism of an amorphous $GeTe_2$ film has been discussed so far by using Raman, another structure model has been reported in which analysis was performed by admitting the presence of $GeTe_4$ as a cluster molecular model (H. Fukumoto, K. Tsunetomo, T. Imura, and Y. Osaka, J. Phys. Soc. Japan, 56, 158 (1987)).

From the above discussion, it can be considered that as a crystalline phase which appears when an amorphous GeSbTe film is crystallized by a heat treatment, $Sb_2Te_3$ appears immediately below the first crystallization temperature, but no crystal as the α-GeTe phase precipitates, so the $GeTe_4$ structure as a cluster molecule is preserved. It is known that the reflectance changes at a temperature corresponding to the first crystallization temperature when an amorphous GeSbTe film is heated, when the results of analyses of the structures discussed above are taken into account, it can be assumed that this change in reflectance is caused not because both of $GeTe_4$ cluster molecules and $SbTe_3$ cluster molecules of an amorphous GeSbTe consisting of an aggregate of these clusters simultaneously change in phase into their respective crystalline phases, but because the $SbTe_3$ cluster molecules first change in phase into an $Sb_2Te_3$ crystalline phase. That is, an amorphous GeSbTe film which has been conventionally interpreted uniquely as an amorphous state can be considered to have a structure in which a chemically ordered bond is present between Ge—Te and Sb—Te to form cluster molecules consisting of $GeTe_4$ and $SbTe_3$ and these molecules are present at random, rather than a structure in which atoms of these elements exist at random to have a statistical distribution. It is therefore found that the phase change is not from an amorphous state consisting of randomly existing Sb, Ge, and Te to a crystalline phase, but from individual cluster molecules in an amorphous state to their respective crystal structures.

No Raman band related to GeTe was found in the Raman spectrum of the Ge—Sb—Te film crystallized at a higher temperature, 450° C. This is so because a phase change occurred from α-GeTe to β-GeTe as a Raman inactive phase. It was also found that two Raman bands attributed to $Sb_2Te_3$ were present at 170 $cm^{-1}$ and 112 $cm^{-1}$ in the Raman band of the GeSbTe film crystallized at 450° C. This demonstrates that GeTe as crystalline Ge—Te and $Sb_2Te_3$ as crystalline Sb—Te are present at 450° C.

The crystalline structure discussed so far is true for a region to be described below in a triangular diagram of Ge, Sb, and Te. This is so because amorphous structures in this defined composition region are similar to those observed by using Raman spectra and consequently changes in these structures upon crystallization are also similar.

Figure 20:
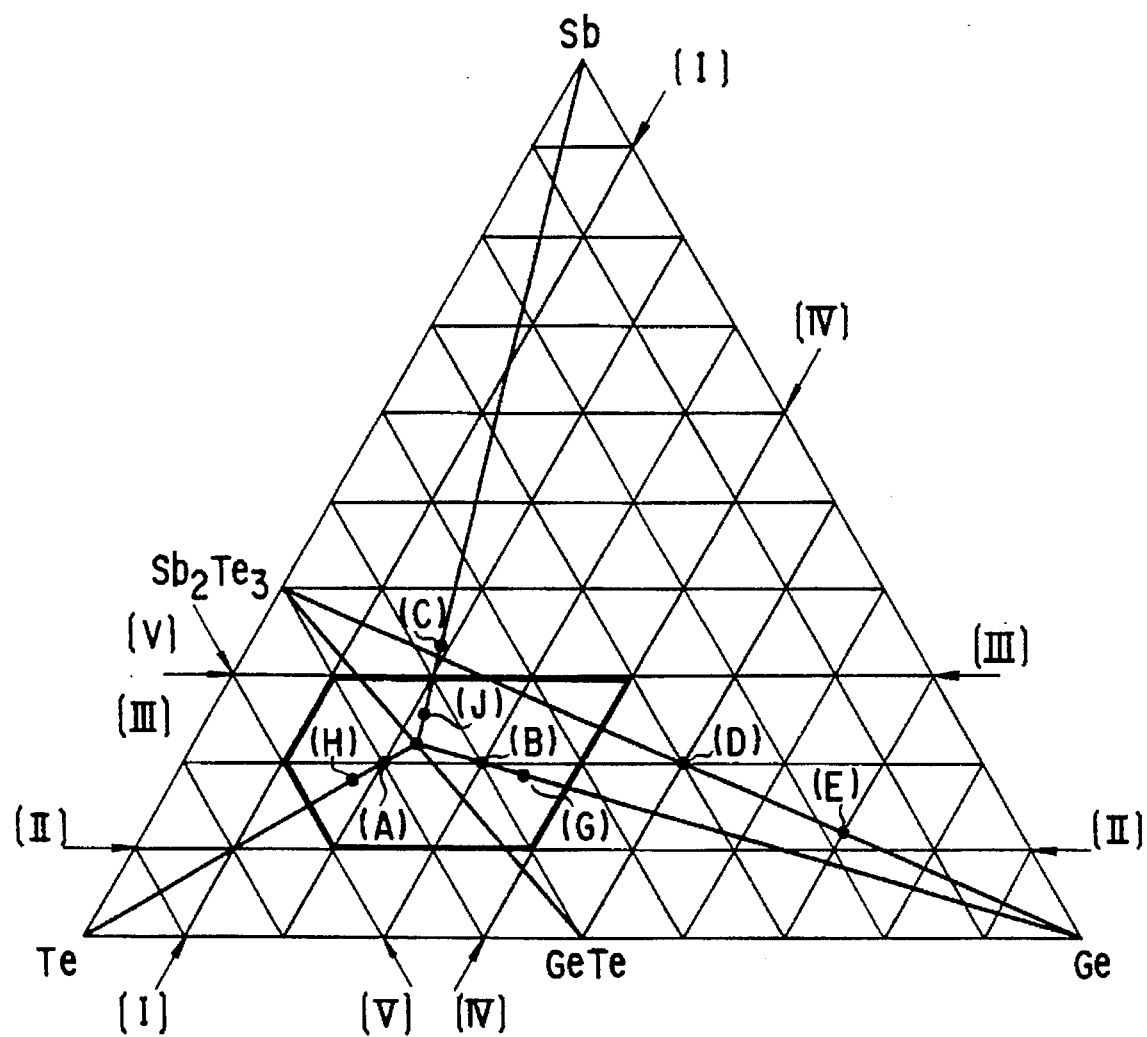
FIG. 20 is a triangular diagram of Ge, Sb, and Te.

In the triangular diagram of Ge, Sb, and Te illustrated in FIG. 20, the composition of a GeSbTe alloy of an amorphous GeSbTe film is given by a composition in a composition region surrounded by a straight line [I] connecting a composition $Ge_{10}Sb_0Te_{90}$ and a composition $Ge_{10}Sb_{90}Te_0$, a straight line [II] connecting a composition $Ge_0Sb_{10}Te_{90}$ and a composition $Ge_{90}Sb_{10}Te_0$, a straight line [III] connecting a composition $Ge_0Sb_{30}Te_{70}$ and a composition $Ge_{70}Sb_{30}Te_0$, a straight line [IV] connecting a composition $Ge_{40}Sb_0Te_{60}$ and a composition $Ge_{40}Sb_{60}Te_0$, and a straight line [V] connecting a composition $Ge_{30}Sb_0Te_{70}$ and a composition $Ge_0Sb_{30}Te_{70}$. A Raman spectrum within this limited composition range was similar to the behavior of a $(Ge_2Sb_2Te_5)_{97}Sb_3$ film, as an example, in both amorphous and crystalline states.

(6) Recording sensitivities obtained by write once type recording method

Figure 21:
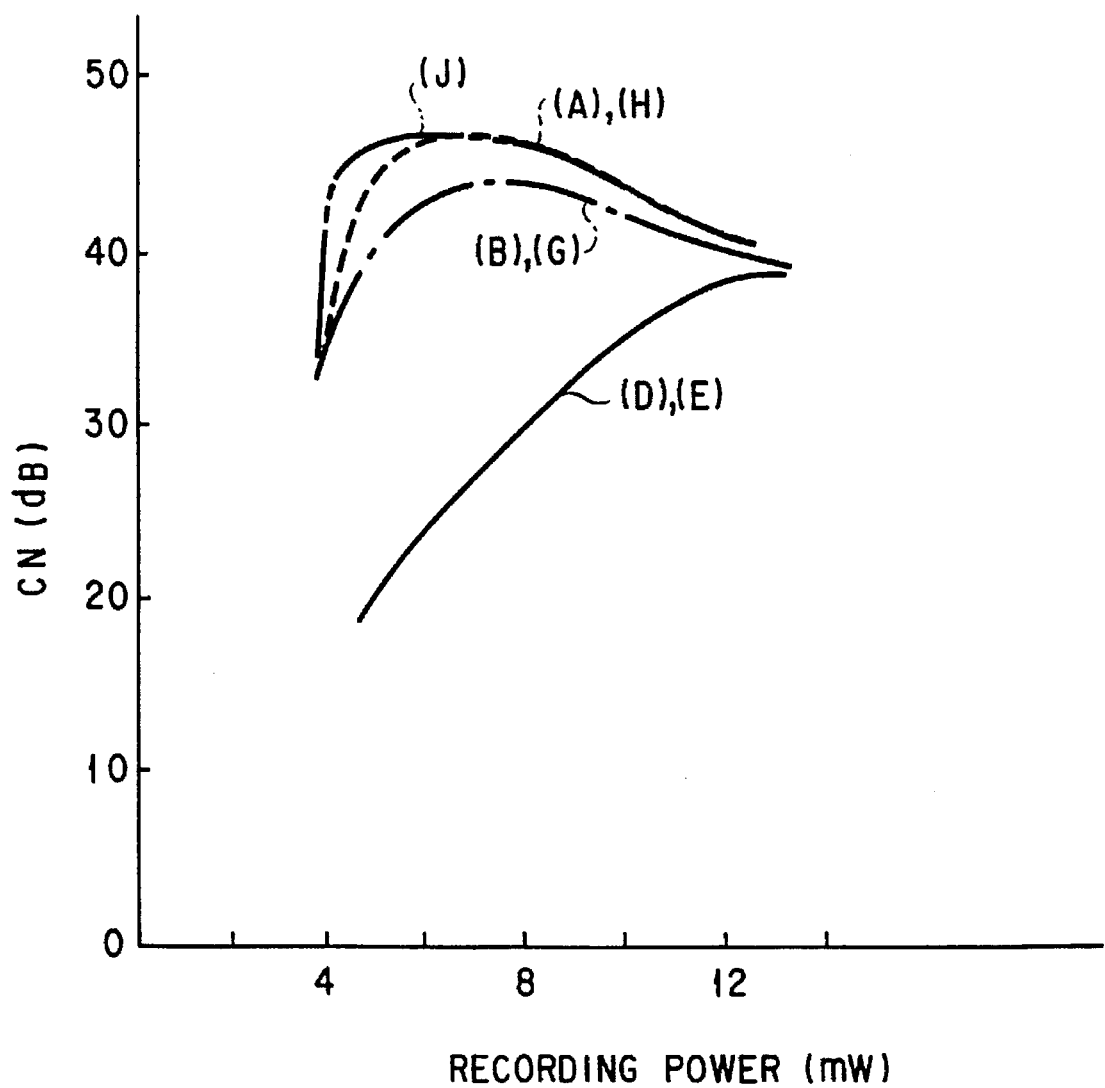
FIG. 21 is a graph showing the recording sensitivities of information recording media having GeSbTe films as recording films.

FIG. 21 shows the recording sensitivities of amorphous GeSbTe films. Referring to FIG. 21, $(Ge_2Sb_2Te_5)_{97}Sb_3$ as a composition (J) with the highest sensitivity has a value of 40 dB or more, as a practical CN value, in a region in which the laser power is as low as about 5 mW. In this recording, a semiconductor laser with a recording wavelength of 780 nm was used as a light source. Each information recording medium was manufactured by forming a 40-nm thick $(Ge_2Sb_2Te_5)_{97}Sb_3$ film on a polycarbonate resin substrate on which a 20-nm thick $ZnS/SiO_2$ film was already formed as a protective film, forming a 30-nm thick $Bi_2Te_3$ film on the $(Ge_2Sb_2Te_5)_{97}Sb_3$ film, and forming a 20-nm thick $ZnS/SiO_2$ film as another protective film on the $Bi_2Te_3$ film.

Practical compositions with high sensitivities next to that of the composition (J) are as follows.

(A) $Ge_{20}Sb_{20}Te_{60}$ (H) $Ge_{19}Sb_{19}Te_{62}$ (B) $Ge_{30}Sb_{20}Te_{50}$ (G) $Ge_{34}Sb_{19}Te_{47}$

The compositions of amorphous GeSbTe films consisting of three elements Ge, Sb, and Te are given in the region indicated by thick lines in FIG. 20.

Samples manufactured with compositions outside the above composition region of Ge, Sb, and Te, e.g., samples with compositions (D) $Ge_{50}Sb_{20}Te_{30}$ (E) $Ge_{70}Sb_{12}Te_{18}$ had low recording sensitivities, as shown in FIG. 21. This is so because, as illustrated in FIG. 4 mentioned earlier, a dimer of Ge—Te clusters having a Ge—Ge bond is present in addition to cluster molecules of Ge—Te and Sb—Te. Since this dimer structure exists in an amorphous state, a laser power for breaking this bond is required, and this increases the recording laser power for performing recording, i.e., causing a phase change, thereby introducing inconveniences. More specifically, the dimer decomposes into the individual cluster molecules, and then the cluster molecules change in phase into their respective crystalline phases.

That is, Ge—Te and Sb—Te are present as crystalline phases in crystalline GeSbTe. When the composition region of the present invention is appropriately chosen, however, cluster molecules of Ge—Te and Sb—Te alone are present in an amorphous GeSbTe film, and no cluster molecular component having a Ge—Sb bond exists any longer. This makes it possible to increase the sensitivity of recording performed using a phase change from an amorphous state to a crystalline state in a write once type recording method.

In this embodiment, the $Bi_2Te_3$ film was stacked on the GeSbTe film. However, this $Bi_2Te_3$ film need not be formed because the basic information recording sensitivity depends upon the structural change in the GeSbTe film itself. In addition, the use of the $Bi_2Te_3$ film can prevent a heat flow from being accumulated in only the GeSbTe film. Consequently, the accumulation of heat is decreased by about 10% compared to that when the recording mark is small, and this makes the medium more suitable for high-density recording. This is so because the heat flow during recording is controlled.

Lastly, an ultraviolet-curing resin layer with a thickness of a few microns was formed on the resultant structure. Recording was performed by rotating this information recording medium at a linear velocity of 14 m/s and a recording frequency of 8.8 MHz. The resolution of a spectrum analyzer for measuring reproduced signals was set at 30 kHz.

In FIG. 20, the composition line [V] means that a Te content exceeding 70 at % is unpreferable because the crystallization temperature in an amorphous state decreases to degrade the thermal stability of an amorphous phase itself.

For example, assuming that the crystallization temperature is the temperature of heat generated by a film sample when the sample is heated by differential scanning calorimetry (DSC) at a scan speed of 10° C./min in a nitrogen atmosphere so that the sample is not oxidized, the crystallization temperature of a composition represented by the composition line (V) is 150° C. or lower, i.e., the composition readily crystallizes. A crystallization temperature in a limited composition is at least 150° C. but 250° C. or lower. The crystallization temperatures of the compositions (E) and (D) are higher than this range, so the recording sensitivities of the samples having these compositions decrease. As an example, the crystallization temperature of the composition (E) is 335° C., indicating that this composition is unpreferable.

when a recording film consisting of a GeSbTe alloy is used as a write once type information recording medium and the wavelength of a recording laser is in the near infrared range of 600 to 850 nm, it is desirable that the film thickness of the recording film be 20 to 50 nm, a protective film made of a mixture of ZnS and $SiO_2$ in which the mixing ratio of ZnS is 50 to 80 at %, and the film thickness of the protective film be 20 to 60 nm, for the reasons explained below. That is, if the film thickness of the GeSbTe film is larger than 50 nm, the heat capacity of the film increases to decrease the recording sensitivity. If the film thickness of the GeSbTe film is smaller than 20 nm, the reflectance of the entire medium including the protective film undesirably decreases. This is so because the value of $\underline{k}$ of $n^*=n-ik$, which represents the optical complex index of refraction of the GeSbTe film, is 1.1 to 1.5 within the wavelength range of light of 600 to 800 nm, i.e., the reflectance changes in accordance with the film thickness by a multiple internal reflecting effect.

The composition of the protective film is defined as described above because the internal stress of the film increases to decrease the adhesion of the film if the ZnS content is 100 at %. In addition, in this case, since the structure of the film is in a crystalline state, scattering of light is undesirably caused in the grain boundaries of the crystal. For these reasons, the film is set in an amorphous state or in a very fine crystalline state by mixing $SiO_2$. Furthermore, the reflectance changes due to even a slight change in film thickness because ZnS has a large refractive index. This is unpreferable in the manufacture of films and can be decreased by mixing $SiO_2$. However, if $SiO_2$ exceeding 50 at % is present in $ZnS/SiO_2$, oxygen freed from an $SiO_2$ component formed during sputtering may oxidize the recording film. This free oxygen is oxygen removed from a normal Si—O bond lattice and present in lattice spacings. This $ZnS/SiO_2$ film can be formed by sputtering in the same way as for the recording film. For example, the film is formed by introducing Ar gas into a chamber, so that the sputtering pressure is 0.65 Pa, by using an alloy target made of a mixture of ZnS and $SiO_2$ as a sputtering target. If it is necessary to precisely control loss of oxygen or sulfur during the sputtering, it is also possible to mix 20 vol % or less of oxygen or hydrogen sulfide in addition to Ar gas.

When a recording film consisting of a GeSbTe alloy and a second recording film are stacked to be used as a write once type recording medium and the wavelength of a recording laser is in the near infrared region of 600 to 850 nm, it is required that the film thickness of the GeSbTe film be 20 to 50 nm, the second recording film contain Bi or an alloy of Bi and Te, the alloy composition be within the range of ±10 at % as a composition of Bi with respect to $Bi_{40}Te_{60}$ which is a composition corresponding to an intermetallic compound $Bi_2Te_3$, and the film thickness of the second recording film be 20 to 50 nm. In addition, a $ZnS/SiO_2$ film is used as a protective film under the same conditions as mentioned above. The second recording film must have thermal properties different from those of GeSbTe and must be hard to oxidize. Bi or an alloy of Bi and Te has proved to be suitable for this purpose. However, the BiTe alloy is readily oxidized to degrade the environmental stability if the composition of Bi falls outside the range of ±10 at % with respect to $Bi_{40}Te_{60}$ as a composition corresponding to an intermetallic compound. In addition, no effect was obtained if the film thickness was smaller than 20 nm. If, on the other hand, the film thickness was larger than 50 nm, the recording sensitivity decreased.

(8) Structure of recording film

Observation of the recording film at a recording laser power of 5 mW shown in FIG. 21 was performed by using a transmission electron microscope. Consequently, the recording mark was found to be crystalline. When electron diffraction was done in this mark, a diffraction pattern which was considered to be caused by $Sb_2Te_3$ was observed.

(9) Overwrite recording characteristics

A 20-nm thick $(Ge_2Sb_2Te_5)_{97}Sb_3$ film was formed on a polycarbonate substrate on which a 150-nm $ZnS/SiO_2$ film was already formed as a protective film, and a 25-nm thick $ZnS/SiO_2$ film was formed as a protective film on the $(Ge_2Sb_2Te_5)_{97}Sb_3$ film. In addition, a 100-nm thick Al alloy film was formed as a reflective film on the $ZnS/SiO_2$ film, and an ultraviolet-curing resin layer with a thickness of several microns was formed as the uppermost layer by spin coating. The composition of the amorphous GeSbTe film consisting of three elements Ge, Sb, and Te was as shown in the triangular diagram of Ge, Sb, and Te in FIG. 20 including the above composition $(Ge_2Sb_2Te_5)_{97}Sb_3$.

As the polycarbonate resin substrate, a substrate with a track pitch of 1.6 μm (groove width 0.6 μm, groove depth 0.06 μm) was used. In addition, a laser with a wavelength of 830 nm and an NA of an objective lens of 0.55 was used as the optical recording conditions. The recording conditions were a pulse width of 85 ns, a recording frequency of 1.4 MHz, and a medium linear velocity of 5 m/s, and the resolution of a spectrum analyzer for measuring the CN ratio was set at 30 kHz. When the film thickness of particularly the protective film on the upper side (the reflecting film side) of the recording film was 40 nm or more in the layer arrangement of the recording medium, the overwrite erasure characteristics were degraded significantly. Therefore, this film thickness was set to 25 nm.

As the recording characteristics, a CN ratio of about 50 dB was obtained at a recording power of 15 mW. The overwrite characteristics were checked at a linear velocity of 10 m/s by a mark length recording method. The mark length recording method was used because the method can indicate the characteristics of a medium more clearly than in an mark position recording method in which the mark erasure characteristics are formed by only pits having the same size. As a result, the erase ratio was 28 dB when recording was performed at 17 mW and an erasing power of 8 mW was superposed. When the linear velocity was raised to 12 m/s, the erase ratio was decreased to 22 dB. This was the result in an optimal case in which the recording power was 18 mW and the erasing power was 9 mW in association with the linear velocity. When the linear velocity was raised to about 17 m/s, the erase ratio was decreased to 20 dB or lower for a recording power of 19 mW and an erasing power of 9.5 mW.

The above characteristics are overwrite characteristics. There is another method by which old information is erased with continuous light after recording. When erasure was done by this method by using the laser power used in overwrite, e.g., DC (direct current) light with 8 mW, the erase ratio was raised to about 30 dB. Therefore, in situations where the information recording rate can be low, recording and erasure can be performed more reliably by recording new information after erasing old one with continuous DC light. In this sense, a conventional erasable information recording medium also can be provided by the use of the GeSbTe film with the composition of the present invention.

In samples manufactured with compositions outside the composition region of Ge, Sb, and Te discussed above, e.g., in samples composed of $Ge_{50}Sb_{20}Te_{30}$ and $Ge_{70}Sb_{12}Te_{18}$, CN ratios of 33 dB and 30 dB, respectively, were obtained as recording characteristics at a recording power of 15 mW. That is, the recording sensitivities were low as shown in FIG. 21. The overwrite characteristics were checked at a linear velocity of 10 m/s by the mark length recording method in the same manner as mentioned above. Consequently, the erase ratios were 15 dB and 13 dB when recording was done at 20 mW and an erasing power of 10 mW was superposed, when the linear velocity was raised to 12 m/s, the erase ratio was decreased to 10 dB. This was the result in an optimal case in which the recording power was 18 mW and the erasing power was 9 mW in association with the linear velocity. When the linear velocity was further raised to about 17 m/s, almost no recording was achieved.

This is so because a dimer of Ge—Te clusters having a Ge—Ge bond is present in addition to cluster molecules of Ge—Te and Sb—Te. Since this dimer structure exists in an amorphous state, a laser power for breaking this bond is required, and this increases the recording laser power for performing recording, i.e., causing a phase change, thereby introducing inconveniences. More specifically, the dimer decomposes into the individual cluster molecules, and then the cluster molecules change in phase into their respective crystalline phases.

That is, Ge—Te and Sb—Te are present as crystalline phases in crystalline GeSbTe. When the composition region of the present invention is properly chosen, however, cluster molecules of Ge—Te and Sb—Te alone are present in an amorphous GeSbTe film, and no cluster molecular component having a Ge—Sb bond exists any longer. This makes it possible to increase the sensitivity of recording performed using a phase change from an amorphous state to a crystalline state in a write once type recording method.

As has been described above, the information recording medium according to the first invention of the present invention comprises a first recording film formed on a substrate and having an amorphous phase consisting of an alloy containing at least Ge and Te, and a second recording film formed on the first recording film and consisting of a material with a relatively large light absorption coefficient. The alloy of the first recording film exhibits a Raman scattering spectrum having scattering peaks at 140 to 160 $cm^{-1}$ and 120 to 130 $cm^{-1}$ and no scattering peaks at 100 to 110 $cm^{-1}$. Therefore, this information recording medium has a high recording sensitivity.

The first invention reveals the structure of an amorphous GeSbTe film and consequently the correspondence of the structure with the recording sensitivity of an information recording medium using a recording method of diffusing and alloying this film, that have been conventionally unknown. This makes it possible to use the characteristic value of the structure of the GeSbTe film as a performance index of the recording sensitivity.

The information recording medium according to the second invention of the present invention comprises a recording film formed on a substrate and having an amorphous phase made of an alloy containing Ge, Sb, and Te. The amorphous phase of the recording film is a mixed phase containing cluster molecules consisting of two elements, Ge—Te and/or Sb—Te. Recording is performed by changing optical characteristics by changing in phase the cluster molecules into crystalline GeTe and crystalline SbTe by radiating recording light on the recording film.

The second invention reveals that information recording can be performed by precipitating crystalline $Sb_2Te_3$ at lower temperatures. Formation of a three-element intermetallic compound, $Ge_2Sb_2Te_5$, has been conventionally considered necessary when an amorphous GeSbTe film made of Ge, Sb, and Te is used in information recording, so it has been attempted to crystallize the material by raising the power of a laser energy beam. However, the second invention makes it possible to perform high-sensitivity information recording at a lower laser power.

According to the second invention, it is also possible to change in phase an amorphous state as a recording state to a crystalline state as an erasure state with a relative low laser power in erasing information. Consequently, the number of repetitive erase operations can be increased.

In addition, the bonded state of Ge, Sb, and Te in an amorphous state has been conventionally unknown, so the correlation between the composition and the recording sensitivity has been unclear. However, by measuring Raman scattering spectra according to the method of the present invention, it is possible to find out the correspondence of a desired recording sensitivity with the structure of an amorphous state and the structure of a crystalline state in any of a write once type recording mode, an erasable recording mode, and an overwritable recording mode. Since a predetermined composition range can be set in this manner, there can be provided an information recording medium with a high recording sensitivity.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information recording medium comprising:
    a first recording film formed on a substrate and having an amorphous phase made of an alloy containing at least Ge and Te; and
    a second recording film formed on said first recording film and made of a material with a relatively large light absorption coefficient,
    wherein said alloy of said first recording film exhibits a Raman scattering spectrum having scattering peaks at 140 to 160 $cm^{-1}$ and 120 to 130 $cm^{-1}$ and no scattering peaks at 100 to 110 $cm^{-1}$, and recording is performed by changing optical characteristics by alloying the materials of said first and second recording films by radiating recording light on said first and second recording films.

2. A medium according to claim 1, wherein a ratio of an intensity of the scattering peak at 120 to 130 $cm^{-1}$ to an intensity of the scattering peak at 140 to 160 $cm^{-1}$ is at least 1.

3. A medium according to claim 1, wherein said alloy containing at least Ge and Te is one alloy selected from the group consisting of a GeSbTe alloy, a GeSnTe alloy, and a GeInTe alloy.

4. A medium according to claim 1, wherein said material with a relatively large light absorption coefficient is one material selected from the group consisting of Bi, a BiTe alloy, Pb, Pd, Sn, and In.

5. An information recording medium comprising:
    a recording film formed on a substrate and having an amorphous phase made of an alloy containing Ge, Sb and Te, wherein said alloy of said recording film has a phase exhibiting a Raman scattering spectrum having scattering peaks at 140 to 160 $cm^{-1}$ and 120 to 130 $cm^{-1}$ and no scattering peaks at 100 to 110 $cm^{-1}$, and recording is performed by changing in crystalline phase by radiating recording light on said recording film.

* * * * *